US007428600B2

(12) United States Patent
Saito et al.

(10) Patent No.: US 7,428,600 B2
(45) Date of Patent: Sep. 23, 2008

(54) DATA TRANSFER CONTROL DEVICE, ELECTRONIC EQUIPMENT, AND DATA TRANSFER CONTROL METHOD

(75) Inventors: Nobuyuki Saito, Sapporo (JP); Shinsuke Kubota, Sapporo (JP); Kuniaki Matsuda, Sapporo (JP); Kenyou Nagao, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 1098 days.

(21) Appl. No.: 10/377,765

(22) Filed: Mar. 4, 2003

(65) Prior Publication Data

US 2004/0037310 A1 Feb. 26, 2004

(30) Foreign Application Priority Data

Apr. 26, 2002 (JP) ............................ 2002-126708

(51) Int. Cl.
*G06F 3/00* (2006.01)

(52) U.S. Cl. .................. 710/8; 710/7; 710/19; 710/37; 710/110

(58) Field of Classification Search ..................... 710/7, 710/8, 19, 37, 110
See application file for complete search history.

(56) References Cited

U.S. PATENT DOCUMENTS 5,974,486 A * 10/1999 Siddappa ..................... 710/53
7,000,057 B1 * 2/2006 Novell et al. ................ 710/306

FOREIGN PATENT DOCUMENTS

| | | |
|---|---|---|
| JP | A 10-301898 | 11/1998 |
| JP | A 2001-119415 | 4/2001 |
| JP | A 2002-9849 | 1/2002 |
| JP | A 2002-51100 | 2/2002 |
| JP | A 2002-55936 | 2/2002 |
| JP | A 2002-91717 | 3/2002 |
| JP | A 2002-116998 | 4/2002 |

OTHER PUBLICATIONS

USB On-The-Go Implementation TransDimension; Hi-Speed Certified USB; Feb. 26, 2002; pp. 1-28.
U.S. Appl. No. 10/377,763, filed Mar. 4, 2003, Saito et al.
U.S. Appl. No. 10/377,632, filed Mar. 4, 2003, Saito et al.

(Continued)

*Primary Examiner*—Niketa I. Patel
*Assistant Examiner*—Jasjit Vidwan
(74) *Attorney, Agent, or Firm*—Oliff & Berridge, PLC

(57) ABSTRACT

When transfer condition information is set and the start of automatic control transfer is instructed, a transfer controller (host controller) automatically issues a setup stage transaction and automatically transfers a setup stage packet, then, if there is data to be transferred, it automatically issues a data stage transaction and automatically transfers a data stage packet. It then automatically issues a status stage transaction and automatically transfers a status stage packet. Device request data, the total size of transfer data, data stage present/absent information, transfer direction in the data stage, and maximum packet size are set in transfer condition registers. A pipe region is allocated in the packet buffer during host operation of USB On-The-Go.

21 Claims, 22 Drawing Sheets

OTHER PUBLICATIONS

U.S. Appl. No. 10/377,673, filed Mar. 4, 2003, Saito et al.
U.S. Appl. No. 10/369,630, filed Feb. 21, 2003, Saito et al.
U.S. Appl. No. 10/377,764, filed Mar. 4, 2003, Saito et al.
Nobuyuki Saito; "OTG Controller LSI Taking Reduction of CPU Load Into Consideration"; Design Wave Magazine; Apr. 2002; pp. 82-88 and pp. 166; w/English abstract.
Alan Chang; "OTG Controller LSI Taking Reduction of CPU Load Into Consideration"; Design Wave Magazine; Apr. 2002; pp. 82-88 and pp. 166; w/translation.
"SL811HS Embedded USB Host/Slave Controller," p. 5, [on-line] Mar. 14, 2002, <http://www.datasheetcatalog.org/datasheet2/c/0hwx2rtw70qu5585x8753f5olp7y.pdf>.
"On-The-Go Supplement to the USB2.0 Specification Revision 1.0," pp.47-49, [on-line] Dec. 18, 2001, <http://www.usb.org/developers/onthego/otg1_0.pdf>.
"Philips Semiconductors delivers USB On-The-Go chip for direct connectivity," [on-line] Jan. 22, 2002, <http://journal.mycom.co.jp/news/2002/01/22/19.html> and corresponding English article.

* cited by examiner

FIG. 2A SRP (SESSION REQUEST PROTOCOL)
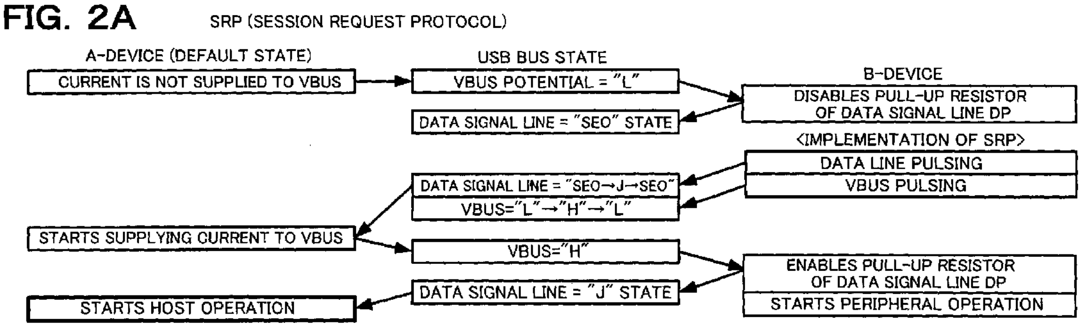
FIG. 2B HNP (HOST NEGOTIATION PROTOCOL)
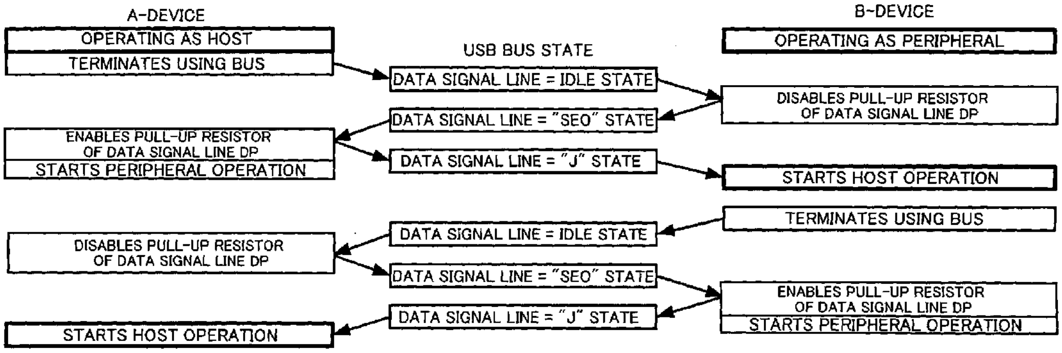

LIST STRUCTURE TYPE DESCRIPTOR

FIG. 6

| DEVICE REQUEST | DATA STAGE ABSENT/ PRESENT | TRANSFER DIRECTION IN DATA STAGE | TRANSFER DIRECTION IN STATUS STAGE |
|---|---|---|---|
| SET-ADDRESS | ABSENT | — | — |
| GET-DESCRIPTOR | PRESENT | IN | OUT |
| SET-DESCRIPTOR | PRESENT | OUT | IN |
| SET-FEATURE | ABSENT | — | — |
| | | | |

AUTOMATIC CONTROL TRANSFER

FIG. 8A DURING DATA TRANSMISSION (OUT TRANSACTION)
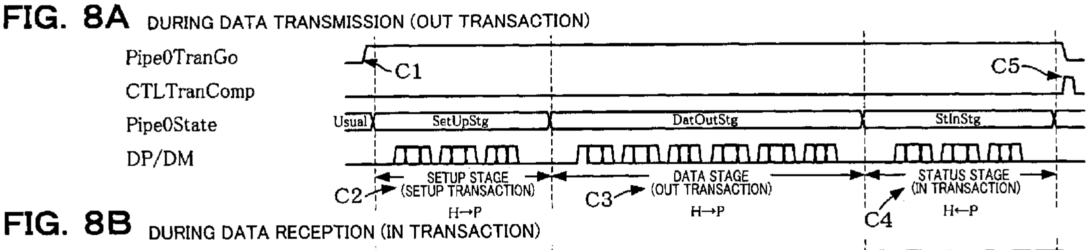
FIG. 8B DURING DATA RECEPTION (IN TRANSACTION)
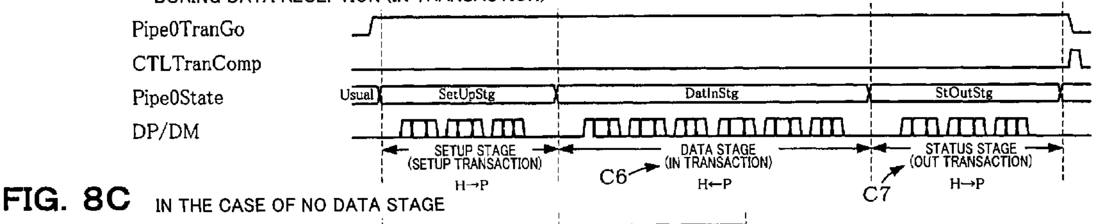
FIG. 8C IN THE CASE OF NO DATA STAGE
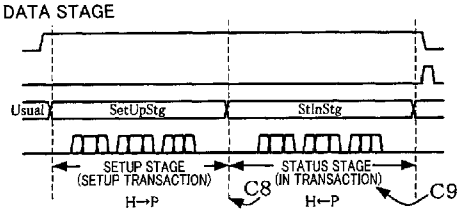

FIG. 9A SETUP STAGE
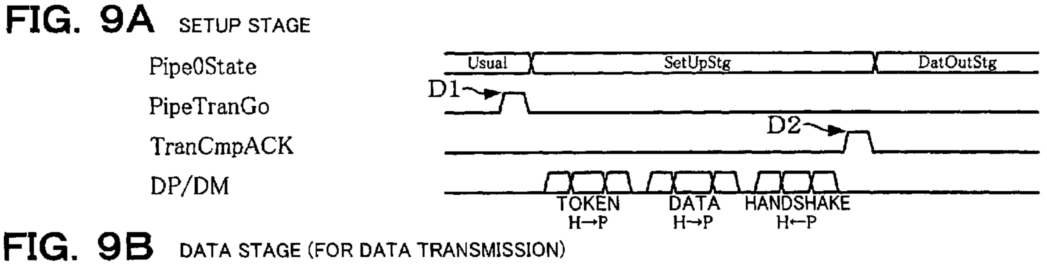
FIG. 9B DATA STAGE (FOR DATA TRANSMISSION)
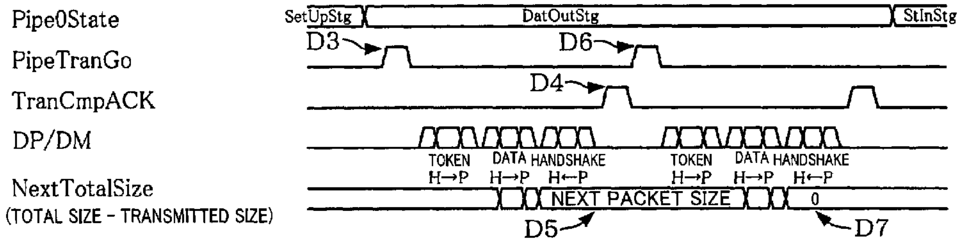
FIG. 9C DATA STAGE (FOR DATA RECEPTION)
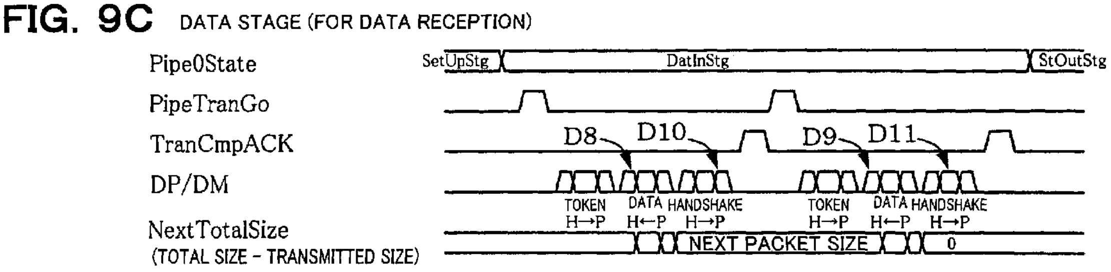

FIG. 10A STATUS STAGE (FOR DATA TRANSMISSION OR IF THERE IS NO DATA STAGE)
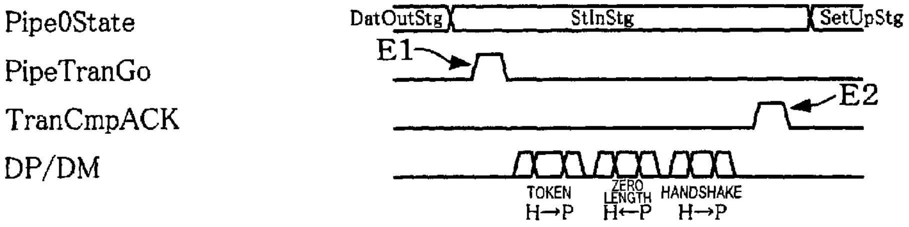
FIG. 10B STATUS STAGE (FOR DATA RECEPTION)
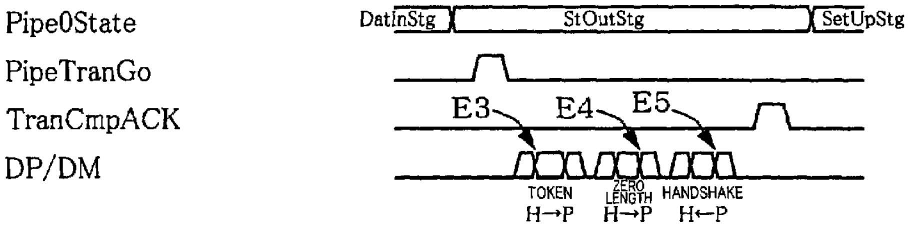

WHEN AUTOMATIC CONTROL TRANSFER MODE IS ON (AUTO)

WHEN AUTOMATIC CONTROL TRANSFER MODE IS OFF (MANUAL)

HOST OPERATION

PERIPHERAL OPERATION

FIG. 16

REGISTER SECTION

| | | | |
|---|---|---|---|
| TRANSFER CONDITION REGISTERS (PIPE/EP CONTROL REGISTERS) (0, a TO e) | HC/PC (PIPE/EP) COMMON REGISTERS | REGISTERS USED BOTH DURING HOST OPERATION (PIPE) AND PERIPHERAL OPERATION (EP) | DATA TRANSFER DIRECTION, TRANSFER TYPE, END POINT NUMBER, MAXIMUM PACKET SIZE, NUMBER OF PAGES, PRESENCE/ ABSENCE OF DMA CONNECTION, ETC. |
| | HC (PIPE) REGISTERS | REGISTERS USED ONLY DURING HOST OPERATION (PIPE) | INTERRUPT TRANSFER TOKEN ISSUE PERIOD, NUMBER OF TRANSACTION CONTINUOUS EXECUTIONS, FUNCTION ADDRESS, TOTAL SIZE OF TRANSFER DATA, AUTOMATIC TRANSACTION START INSTRUCTION, AUTOMATIC CONTROL TRANSFER MODE INSTRUCTION, ETC. |
| | PC (EP) REGISTERS | REGISTERS USED ONLY DURING PERIPHERAL OPERATION (EP) | END POINT ENABLE, HANDSHAKE SPECIFICATION, ETC. |
| | COMMON ACCESS CONTROL REGISTERS FOR PACKET BUFFER (FIFO) | REGISTERS ENABLING ACCESS CONTROL FOR PACKET BUFFER (FIFO) | BUFFER I/O PORT, BUFFER FULL/EMPTY, BUFFER REMAINING DATA SIZE, ETC. |
| INTERRUPT-RELATED REGISTERS | INTERRUPT STATUS REGISTER | REGISTER THAT INDICATES INTERRUPT STATUS (CAUSE) | OTGC-RELATED, HC (PIPE)-RELATED, PC (EP)-RELATED, ETC. |
| | INTERRUPT ENABLE REGISTER | REGISTER THAT SETS INTERRUPT ENABLE/ DISABLE STATE | OTGC-RELATED, HC (PIPE)-RELATED, PC (EP)-RELATED, ETC. |
| BLOCK-RELATED REGISTERS | INTER-BLOCK COMMON REGISTER | REGISTER USED IN COMMON BETWEEN BLOCKS | BLOCK RESET INSTRUCTION, ETC. |
| | BLOCK REGISTERS | REGISTERS USED WITHIN THE Xcvr, OTGC, HC, AND PC BLOCKS | Xcvr CONTROL, OTGC STATE COMMAND, HC STATE COMMAND, FRAME NUMBER, ETC. |
| DMA CONTROL REGISTER | — | REGISTER FOR SETTINGS RELATING TO DMA CONTROL | DMA TRANSFER START INSTRUCTION, TOTAL SIZE OF DMA TRANSFER DATA, ETC. |

BUFFER CONTROLLER

TRANSMISSION (DMA OR CPU --> PACKET BUFFER --> USB)

| | WHEN USING DMA TRANSFER | WHEN USING CPU TRANSFER |
|---|---|---|
| WP | DMA | CPU |
| RP | USB | USB |

RECEPTION (USB --> PACKET BUFFER --> DMA OR CPU)

| | WHEN USING DMA TRANSFER | WHEN USING CPU TRANSFER |
|---|---|---|
| WP | USB | USB |
| RP | DMA | CPU |

DATA TRANSFER CONTROL DEVICE, ELECTRONIC EQUIPMENT, AND DATA TRANSFER CONTROL METHOD

Japanese Patent Application No.2002-126708, filed on Apr. 26, 2002, is hereby incorporated by reference in its entirety.

BACKGROUND

The present invention relates to a data transfer control device, electronic equipment, and a data transfer control method.

The universal serial bus (USB) standard 2.0 that supports high-speed (HS) mode is expanding well in the marketplace, but an interface standard called the USB On-The-Go (OTG) has been settled upon by the USB Implementers Forum (USB-IF). The OTG standard (OTG 1.0) that has been derived as an extension of USB 2.0 holds out the possibility of bringing out new additional value to the USB interface, and it is expected that applications that make use of these characteristics will appear.

This OTG makes it possible to impart a host function to a peripheral (peripheral device) connected to a host (such as a personal computer) by existing USB. This makes it possible to transfer data between peripherals connected by USB, enabling direct connection between a digital camera and a printer, by way of example, so that an image from the digital camera can be printed. It is also possible to connect a digital camera or digital video camera to a storage device, to save data therein.

However, it is usual for a peripheral that is given the host function by OTG to have a limited-capability CPU (processing section) incorporated therein. The addition of the host function therefore places a heavy processing load on the CPU (firmware) of the peripheral, making processing complicated and raising further problems such as impeding other processes and lengthening the design period of the device.

Giving a device the host function by OTG increases the size of the data transfer control device, which increases the cost of the data transfer control device, leading to further problems such as an increase in the cost of the electronic equipment in which the data transfer control device is incorporated.

Four different transfer methods are defined under USB, including a transfer method called control transfer. This control transfer is a transfer method that enables fetching of the information necessary for control of the peripheral, and this control transfer must always be supported by USB devices.

This control transfer is configured of a setup stage, a data stage, and a status stage, but if each of these stages is controlled and managed, a problem arises in that the processing load on the CPU (processing section, or firmware) becomes heavy.

SUMMARY

An aspect of the present invention relates to a data transfer control device for data transfer over a bus, the data transfer control device comprising:

transfer condition registers in which is set transfer condition information;

a transfer controller which performs data transfer including control transfer, based on transfer condition information set in the transfer condition registers; and a buffer controller which performs access control of a packet buffer which stores transfer data, wherein the transfer controller automatically issues a setup stage transaction and automatically transfers a setup stage packet when a start of automatic control transfer is instructed, then automatically issues a data stage transaction and automatically transfers a data stage packet when there is data to be transferred, and then automatically issues a status stage transaction and automatically transfers a status stage packet.

BRIEF DESCRIPTION OF THE SEVERAL VIEWS OF THE DRAWING

FIGS. 2A and 2B are illustrative of the SRP and HNP protocols.

FIG. 6 is illustrative of a device request.

FIGS. 8A, 8B, and 8C show examples of signal wave forms during automatic control transfer.

FIGS. 9A, 9B, and 9C show examples of signal waveforms during the setup and data stages.

FIGS. 10A and 10B show examples of signal waveforms during the status stage.

FIG. 11 is a flowchart of an example of firmware processing when automatic control transfer mode is on.

FIG. 16 is illustrative of the register section.

DETAILED DESCRIPTION OF THE EMBODIMENT

Figure 1A:
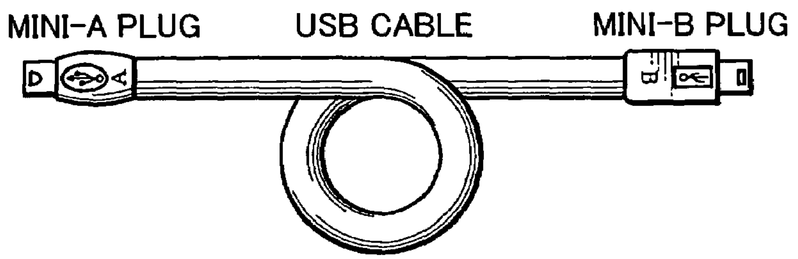
FIGS. 1A, 1B, and 1C are illustrative of the USB OTG standard.

Embodiments of the present invention are described below. Note that the embodiments described below do not in any way limit the scope of the present invention as laid out in the claims herein. In addition, all elements of the embodiments described below should not be taken as essential requirements of the present invention.

An embodiment of the present invention relates to a data transfer control device for data transfer over a bus, the data transfer control device comprising:

transfer condition registers in which is set transfer condition information;

a transfer controller which performs data transfer including control transfer, based on transfer condition information set in the transfer condition registers; and a buffer controller which performs access control of a packet buffer which stores transfer data, wherein the transfer controller automatically issues a setup stage transaction and automatically transfers a setup stage packet when a start of automatic control transfer is instructed, then automatically issues a data stage transaction and automatically transfers a data stage packet when there is data to be transferred, and then automatically issues a status stage transaction and automatically transfers a status stage packet.

If transfer condition information is set and the start of automatic control transfer is instructed by the processing section (firmware) of this embodiment, a setup stage transaction, data stage transaction (if the data stage is present), and status stage transaction are automatically issued in sequence. The packets necessary for the transactions in each stage are transferred automatically. With this embodiment as configured above, the processing from the start of the setup stage to the completion of the status stage can be done automatically by the transfer controller, by simply setting transfer condition information and instructing automatic control transfer start. This therefore enables a reduction in the processing load on the processing section during control transfer, in comparison with a method by which the control and management of data transfer is done in stage units.

With this embodiment, device request data and total size of transfer data of the data stage may be set as the transfer condition information in the transfer condition registers.

This enables the automatic transfer of device request data in the setup stage, by setting the device request data in the transfer condition registers. By setting the total size of transfer data in the transfer condition registers, it becomes possible to use data packets to automatically transfer that total size of data in the data stage.

With this embodiment, data stage present/absent information, a transfer direction in the data stage, and maximum packet size may be set as the transfer condition information in each of the transfer condition registers.

Note that information such as the data stage present/absent information or the transfer direction in the data stage could also be obtained by decoding the device request data (command).

With this embodiment, the transfer controller may generate an interrupt with respect to a processing section when the status stage transaction has completed.

This enables the processing section to perform other processes during the period from after the start of automatic control transfer has been instructed until the interrupt is generated, thus making the processing more efficient.

With this embodiment, the transfer controller may halt the automatic control transfer and generate an interrupt with respect to a processing section, when a stall has been received from an end point.

This makes it possible to invalidate the automatic control transfer when a stall is received from the end point, enabling appropriate processing.

With this embodiment, the transfer controller may comprise:

a circuit which instructs a start of a setup stage transaction when a start of automatic control transfer is instructed;

a circuit which selects one of an execution of a data stage IN transaction, an execution of a data stage OUT transaction, and no data stage, based on a transfer direction in the data stage and data stage present/absent information, when the started setup stage transaction has completed;

a circuit which instructs a start of a data stage IN transaction when the execution of the data stage IN transaction has been selected, or instructs a start of a data stage OUT transaction when the execution of the data stage OUT transaction has been selected; and a circuit which instructs a start of a status stage OUT transaction when the started data stage IN transaction has completed, or instructs a start of a status stage IN transaction when the started data stage OUT transaction has completed or no data stage has been selected.

This makes it possible to automatically issue a string of transactions of the setup stage, data stage, and status stage, without involving the processing section.

With this embodiment, a plurality of pipe regions may be allocated in the packet buffer, each of the pipe regions storing data transferred to and from corresponding one of pipe regions, transfer condition information for data transfer between each of the pipe regions and each of the end points may be set in each of the transfer condition registers, and the transfer controller may automatically issue a control transfer transaction, based on transfer condition information that has been set in one of the transfer condition registers corresponding to a pipe region for control transfer among the pipe regions, and may perform automatic control transfer between the pipe regions for control transfer and an end point for control transfer among the end points.

With this embodiment, a plurality of pipe regions (buffer regions) are allocated with respect to the packet buffer. In such a case, each of the pipe regions is allocated to corresponding one of the end points of the bus. In each of the pipe regions is stored (buffered) data to be transferred (transmitted or received) to and from the corresponding one of the end points. The buffer controller performs access control (region management) of the packet buffer (buffer) in which these pipe regions are allocated.

With this embodiment, transfer condition information (end point information, pipe information) for data transfer between each pipe region and each end point is set in the transfer condition registers (pipe registers). The transfer condition information for control transfer in this case is set in the transfer condition register assigned to a pipe region for control transfer. The transfer controller automatically issues a transaction with respect to the end point for control transfer, based on this transfer condition information set in the transfer condition register, to perform automatic control transfer between the pipe region and the end point. This makes it possible to reduce the processing load on the processing section that controls the data transfer control device.

With this embodiment, the pipe regions may include a pipe region dedicated to the end point for control transfer and a general-purpose pipe region capable of being assigned to arbitrary one of the end points, and the transfer controller may use the dedicated pipe region to perform automatic control transfer.

It is therefore possible to prevent confusion in the user, by providing a pipe region dedicated to an end point for control transfer. It is also possible to modify the correspondence between pipe regions and end points dynamically, by allocating a general-purpose pipe region that can be assigned to arbitrary one of the end points, enabling efficient scheduling of data transfer.

The data transfer control device of this embodiment may further include:

a state controller which controls a plurality of states including a state of a host operation, in which the data transfer control device operates as a role of a host, and a state of a peripheral operation, in which the data transfer control device operates as a role of a peripheral, the transfer controller may include:

a host controller which performs data transfer as a host during host operation; and a peripheral controller which performs data transfer as a peripheral during peripheral operation, and the host controller may perform automatic control transfer during the host operation.

With this embodiment, when a state controlled by the state controller becomes the state of host operation, by way of example, data transfer as a role of host is performed by the host controller. Similarly, when the state controlled by the state controller becomes the state of peripheral operation, data transfer as a role of peripheral is performed by the peripheral controller. This makes it possible to realize the dual-role device function.

With this embodiment, the host controller performs automatic control transfer which automatically issues transactions for a string of stages in the control transfer, during host operation. This enables a reduction in the processing load on the processing section during host operation, while implementing the dual-role device function.

With this embodiment, the data transfer conforming to the universal serial bus (USB) on-the-go (OTG) standard may be performed.

An embodiment of the present invention also relates to electronic equipment including:

any of the above-described data transfer control devices;

a device which performs output processing, fetch processing, or storage processing on data to be transferred through the data transfer control device and the bus; and a processing section which controls data transfer of the data transfer control device.

An embodiment of the present invention further relates to a data transfer control method for data transfer through a bus; the data transfer control method including:

setting transfer condition information in transfer condition registers;

performing data transfer including control transfer, based on transfer condition information set in the transfer condition registers;

performing access control of a packet buffer which stores transfer data; and automatically issuing a setup stage transaction and automatically transferring a setup stage packet when a start of automatic control transfer is instructed, then automatically issuing a data stage transaction and automatically transferring a data stage packet when there is data to be transferred, and then automatically issuing a status stage transaction and automatically transfers a status stage packet.

An embodiment of the present invention is described below with reference to the accompanying figures.

1. OTG

The USB On-The-Go (OTG) function will first be briefly described.

1.1 A Device and B Device

With OTG, the Mini-A plug and Mini-B plug are defined as standard connectors, as shown in FIG. 1A. Mini-AB receptacles are defined as connectors that enable connection for both of these Mini-A and Mini-B plugs (generally speaking: first and second plugs of a cable).

Figure 1B:
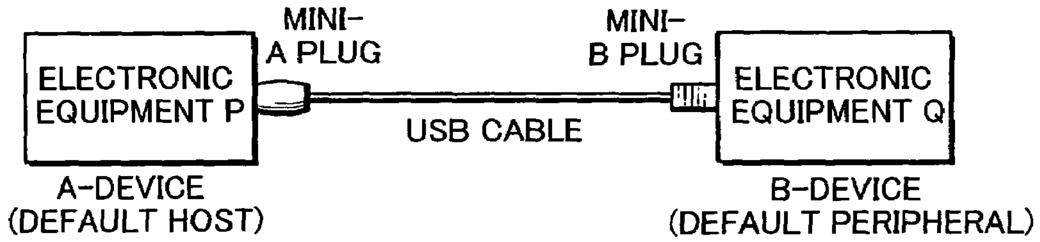
Figure 1C:
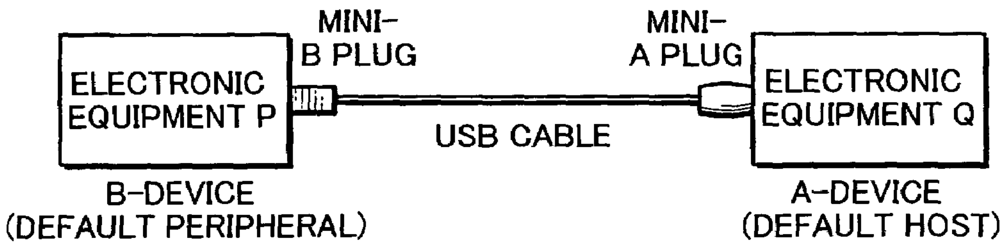

If the Mini-A plug of a USB cable is connected to electronic equipment P and the Mini-B plug is connected to electronic equipment Q, as shown in FIG. 1B by way of example, the electronic equipment P is set to be the A-device and the electronic equipment Q is set to be the B-device. If the Mini-B plug and Mini-A plug are connected to electronic equipment P and Q as shown in FIG. 1C, on the other hand, electronic equipment P and Q are set to be the B-device and the A-device, respectively.

An ID pin in the Mini-A plug is connected to ground and an ID pin in the Mini-B plug is in a floating state. Each piece of electronic equipment can determined whether a Mini-A plug or a Mini-B plug is connected to it, by using a built-in pull-up resistor circuit to detect the voltage level of that ID pin.

With OTG, the A-device (master) becomes the side (supply source) that supplies power (VBUS) and the B-device (slave) becomes the side that receives power (supply destination). The default state of the A-device is host and the default state of the B-device is peripheral.

1.2 Dual-Role Device

OTG enables the definition of a dual-role device that can perform both the role of a host (simple host) and the role of a peripheral.

A dual-role device can be either host or peripheral. The partner connected to the dual-role device determines the role of the dual-role device uniquely, depending on whether it is a host or peripheral under the prior-art USB standard. In other words, if the connected partner is a host, the dual-role device becomes a peripheral, whereas if the connected partner is a peripheral, the dual-role device becomes a host.

If the connected partner is also a dual-role device, on the other hand, the two dual-role devices can negotiate the roles of host and peripheral between themselves.

1.3 SRP and HNP

A dual-role device has session request protocol SRP and host negotiation protocol HNP functions, as shown in FIGS. 2A and 2B.

In this case, the session request protocol SRP is a protocol by which the B-device requests the supply of VBUS (power) from the A-device.

With OTG, if no bus is used, the A-device can halt the supply of VBUS. This makes it possible to prevent wasteful power consumption when the A-device is a small portable device, by way of example. If the B-device requires the supply of VBUS after the A-device has stopped the supply of VBUS, this SRP can be used to request the restart of the VBUS supply from the A-device.

The SRP flow is shown in FIG. 2A. As shown in FIG. 2A, the B-device requests the VBUS supply from the A-device by performing data line pulsing and VBUS pulsing. If the B-device operates as a peripheral after the supply of VBUS by the A-device has started, the A-device starts host operation.

As described with reference to FIGS. 1A to 1C, if dual-role devices are connected together, the A-device that is the side connected to the Mini-A plug becomes the default host and the B-device that is the side connected to the Mini-B plug becomes the default peripheral. With OTG, the host and peripheral roles can be switched without removing the plugs. HNP is a protocol for this switching of the host and peripheral roles.

The HNP flow is shown in FIG. 2B. If the A-device, which is operating as host by default, stops using the bus, the bus goes into an idle state. When the B-device subsequently disables a pull-up resistor of a data signal line DP (D+), the A-device enables the pull-up resistor of DP. This changes the role of the A-device from host to peripheral, starting the operation thereof as a peripheral. The role of the B-device changes from peripheral to host, starting the operation thereof as a host.

If the B-device subsequently stops using the bus and the A-device disables the DP pull-up resistor, the B-device enables the DP pull-up resistor. This returns the role of the B-device from host to peripheral, restarting the operation thereof as peripheral. The role of the A-device returns from peripheral to host, starting the operation thereof as host.

The above-described OTG makes it possible for portable devices such as mobile phones and digital cameras to operate as USB hosts, enabling data transfer between portable devices connected in a peer-to-peer fashion. This makes it possible to add more value to the USB interface, enabling the production of applications that could not exist up before.

2. OHCI

With conventional USB, a data transfer control device (host controller) of a personal computer that acts as host conforms to a standard such as the open host controller interface (OHCI) or universal host controller interface (UHCI) proposed by Microsoft. The operating systems (OSs) that is used therefor are limited to OSs such as Windows (registered trade name) produced by Microsoft and the Macintosh OSs produced by Apple.

However, there is an infinite variety of incorporated CPUs and architectures in the small portable devices that are target applications of OTG, as well as the OSs used therein. In addition, the versions of OHCI or UHCI that have been standardized towards the host controllers of personal computers have the prerequisite that they will be installed to function completely as USB hosts, so it is difficult to optimize installation in small portable devices.

Figure 3A:
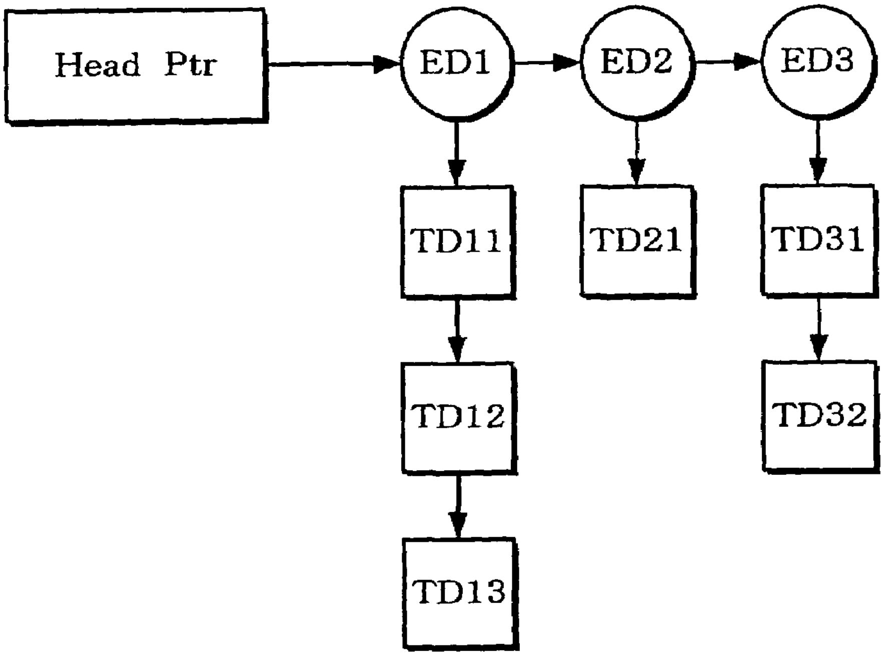
FIGS. 3A and 3B are illustrative of the OHCI list structure type descriptor.

An example of the list structure type descriptor used by OHCI is shown in FIG. 3A.

In FIG. 3A, end point descriptors ED1, ED2, and ED3 are linked by link pointers and include information that is necessary for communication between end points 1, 2, and 3. Transfer descriptors TD11 to TD13, TD21, and TD31 to TD32 are linked to ED1, ED2, and ED3 by further link pointers. Information that is necessary for packet data transferred between the end points 1, 2, and 3 is included within these transfer descriptors.

Figure 3B:
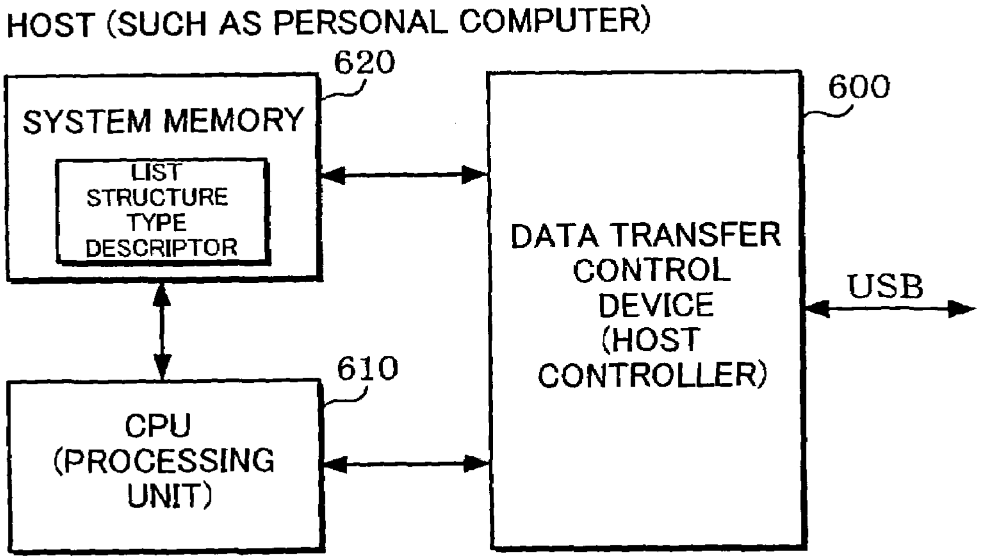

The list structure type descriptors of FIG. 3A are created by firmware (host controller/driver) operating on a CPU 610 (generally speaking: a processing unit) shown in FIG. 3B, and are written to system memory 620. In other words, the firmware assigns end point descriptors to end points within the system, and creates endpoint descriptors and transfer descriptors based on end point information. These descriptors are linked by link pointers and are written to the system memory 620.

A data transfer control device 600 (host controller) reads the list structure type descriptors that were written to the system memory 620, and performs data transfer based on the information written in the end point descriptors and transfer descriptors.

Specifically, the data transfer control device 600 (host controller) bases the setting of information for end point 1 on ED1, and transfers data to and from end point 1 based on TD11 that is linked to ED1. Next, it bases the setting of information for end point 2 on ED2, and transfers data to and from end point 2 based on TD21 that is linked to ED2. Similarly, the data transfer control device 600 performs data transfer based on TD31, TD12, TD32, and TD13.

In the manner described above, the firmware (host controller/driver) operating in the CPU of a data transfer control device (host controller) conforming to OHCI has to create descriptors of the complicated structure shown in FIG. 3A. The processing load on the CPU is therefore high.

In such a case, the only device that can be assigned the role of host under the prior-art USB is a personal computer, and that personal computer has to have a high-performance CPU. It is therefore possible to have spare capacity therein, even during the creation of descriptors of the complicated structure shown in FIG. 3A.

However, the CPU (embedded CPU) incorporated into a small portable device (such as a digital camera or mobile phone), which is the target application for OTG, generally has a much lower level of capabilities than the CPU of a personal computer. If a portable device is to operate as an OTG host, therefore, a large load is placed on the CPU incorporated in the portable device, which impedes other processes and causes problems such as a deterioration in performance.

3. Configurational Example

Figure 4:
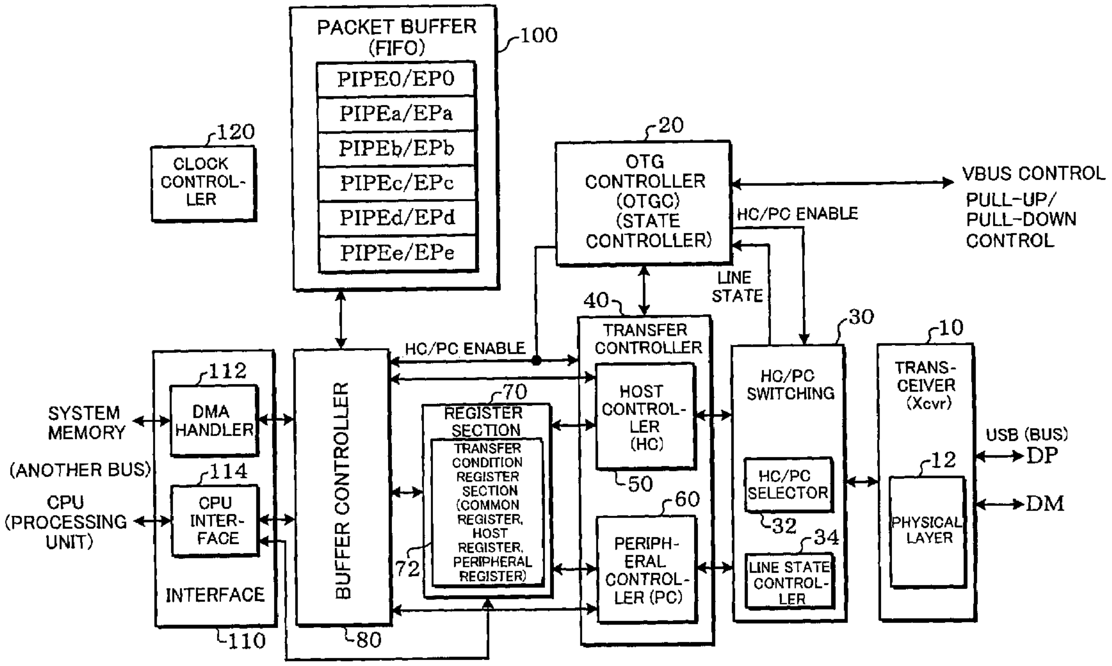
FIG. 4 shows an example of the configuration of a data transfer control device in accordance with one embodiment of the present invention.

An example of the configuration of a data transfer control device in accordance with this embodiment that can solve the above problem is shown in FIG. 4. Note that the data transfer control device of this embodiment need not necessarily have all the circuit blocks shown in FIG. 4; some of those circuit blocks can be omitted.

A transceiver 10 (hereinafter called a Xcvr as appropriate) is a circuit for transmitting and receiving USB (generally speaking: a bus) data, using differential data signals DP and DM, and it includes a USB physical-layer (PHY) circuit 12. More specifically, the transceiver 10 creates line states (such as J, K, and SEO) for DP and DM, and performs serial-to-parallel conversion, parallel-to-serial conversion, bit stuffing, bit unstuffing, NRZI decoding, and NRZI encoding. Note that the transceiver 10 could be provided outside of the data transfer control device.

An OTG controller 20 (generally speaking: a state controller, hereinafter called OTGC as appropriate) performs various processes for implementing OTG SRP and HNP functions (see FIGS. 2A and 2B). In other words, the OTG controller 20 controls a plurality of states including a state for host operation in which the device is operating as host and a state for peripheral operation in which the device is operating as a peripheral.

More specifically, state transitions for when the dual-role device is operating as the A-device (see FIGS. 1B and 1C) and state transitions for when it is operating as the B-device are defined within the OTG standard. The OTG controller 20 includes a state machine for implementing these state transitions. The OTG controller 20 includes circuits that detect (monitor) the USB line state, the VBUS level, and the ID pin state. The state machine included by the OTG controller 20 causes changes in these states (states such as suspension or idle in the host or peripheral), based on the thus-detected information. The state transitions in this case could be implemented by hardware circuitry or they could be implemented by the firmware setting state commands in the registers. When the state changes, the OTG controller 20 controls VBUS and connects/disconnects the DP and DM pull-up/pull-down resistors, based on the post-transition state. A host controller 50 (hereinafter called HC as appropriate) controls the enabling/disabling of a peripheral controller 60 (hereinafter called PC as appropriate).

An HC/PC switching circuit 30 (HC/PC common circuit) performs switching control over the connections with the host controller 50 or the peripheral controller 60. It also instructs the creation of USB data (DP and DM) line states, to the transceiver 10. Note that the connection switching control is implemented by an HC/PC selector 32 and the instruction for the creation of line states is implemented by a line state controller 34.

If the OTG controller 20 makes the HC enable signal go active during host operation (in the host state), by way of example, the HC/PC switching circuit 30 (the HC/PC selector 32) connects the transceiver 10 and the host controller 50. If the OTG controller 20 makes the PC enable signal go active during peripheral operation (in the peripheral state), on the other hand, the HC/PC switching circuit 30 connects the transceiver 10 and the peripheral controller 60. This makes it possible for the host controller 50 and the peripheral controller 60 to operate exclusively.

A transfer controller 40 is a circuit that controls data transfer through USB (generally speaking: a bus), and it includes the host controller 50 (HC) and the peripheral controller 60 (PC).

In this case, the host controller 50 is a circuit that controls data transfer in the role of host during host operation (when the HC enable signal from the OTG controller 20 is active).

In other words, the host controller 50 is connected to the transceiver 10 by the HC/PC switching circuit 30 during host operation. The host controller 50 automatically generates transactions with respect to end points, based on transfer condition information that has been set in a transfer condition register section 72 of the register section 70. Automatic transfer (data transfer by hardware circuitry, without any intervention by the processing section) of data (packets) is performed between pipe regions (PIPE0 to PIPEe, hereinafter called PIPE as appropriate), which are allocated in a packet buffer 100, and end points corresponding to those pipe regions.

More specifically, the host controller 50 performs functions such as arbitration between a plurality of pipe transfers, time management in frames, transfer scheduling, and re-send management. It also manages transfer condition information (operation information) for pipe transfers, through the register section 70. It also manages transactions, creates or analyzes packets, and instructs the creation of suspend/resume/reset states.

With this embodiment, the host controller 50 performs automatic control transfer. In other words, during control transfer it automatically issues transactions for each stage of the setup stage, data stage (if there is a data stage) and status stage (automatic issue of transactions by hardware circuitry, without involving the processing section), and automatically transfers packets necessary for those transactions.

The peripheral controller 60, on the other hand, is a circuit that controls data transfer in the role of a peripheral during peripheral operation (when the PC enable signal from the OTG controller 20 is active).

In other words, the peripheral controller 60 is connected to the transceiver 10 by the HC/PC switching circuit 30 during peripheral operation. It transfers data between end point regions (EP0 to EPe, hereinafter called EPs as appropriate) that have been allocated in the packet buffer 100, based on transfer condition information that has been set in the transfer condition register section 72 of the register section 70.

More specifically, the peripheral controller 60 manages transfer condition information (operation information) for end point transfers, through the register section 70. It also manages transactions, creates or analyzes packets, and instructs the creation of remote wake-up signals.

Note that an end point can have a unique address assigned thereto and is a point (portion) on the peripheral (device). All data transfer between the host and peripheral (device) is done through these end points. A transaction is configured of a token packet, an optional data packet, and an optional handshake packet.

The register section 70 includes various registers for performing actions such as data transfer (pipe transfer, end point transfer) control, buffer access control, buffer management, interrupt control, block control, or DMA control. Note that the registers within the register section 70 could be implemented by memory such as RAM, or by D flip-flops or the like. The registers of the register section 70 need not be in a single bank, but could be disposed separately in blocks (such as HC, PC, OTGC, and Xcvr).

The register section 70 includes the transfer condition register section 72. This transfer condition register section 72 includes registers that store transfer condition information (transfer control information) for data transfer between pipe regions (PIPE0 to PIPEe) allocated in the packet buffer 100 and end points, during host operation. These transfer condition registers are provided to correspond to the pipe regions of the packet buffer 100.

Note that when the device is operating as a peripheral, end point regions (EP0 to EPe) are allocated in the packet buffer 100. Data transfer between the data transfer control device and the host is based on the transfer condition information that has been set in the transfer condition register section 72.

A buffer controller 80 (FIFO manager) performs access (read/write) control and region management for the packet buffer 100. More specifically, it creates and manages accesses addresses for the packet buffer 100, for the CPU (generally speaking: a processing section, direct memory access (DMA), and USB. It also arbitrates accesses to the packet buffer 100 by the CPU, DMA, and USB.

When the device is operating as host, by way of example, the buffer controller 80 sets (establishes) a data transfer path between an interface circuit 110 (CPU or DMA) and the packet buffer 100 and another data transfer path between the packet buffer 100 and the host controller 50 (USB).

When the device is operating as a peripheral, on the other hand, the buffer controller 80 sets a data transfer path between the interface circuit 110 (CPU or DMA) and the packet buffer 100 and another data transfer path between the packet buffer 100 and the peripheral controller 60 (USB).

The packet buffer 100 (FIFO, packet memory, and buffer) is intended to temporarily store (buffer) data (transmission data or reception data) that is being transferred by USB. This packet buffer 100 could be configured of random access memory (RAM), by way of example. Note that the packet buffer 100 could be provided outside of the data transfer control device (it could also be externally attached memory).

During host operation, the packet buffer 100 is used as a first-in, first-out (FIFO) for pipe transfer. In other words, pipe regions PIPE0 to PIPEe (generally speaking: buffer regions) are allocated in a manner to correspond to the USB (bus) end points. Within the pipe regions PIPE0 to PIPEe is stored data (transmission data or reception data) to be transferred with respect to the corresponding end points.

During peripheral operation, on the other hand, the packet buffer 100 is used as a FIFO for end point transfer. In other words, end point regions EP0 to EPe (generally speaking: buffer regions) are allocated in the packet buffer 100. Within the end point regions EP0 to EPe is stored data (transmission data or reception data) to be transferred with respect to the host.

Note that the buffer regions allocated in the packet buffer 100 (the regions set to pipe regions during host operation or end point regions during peripheral operation) are set to be regions in which the information that is input thereto first is output therefrom first (FIFO regions).

PIPE0 is a pipe region that is dedicated to end point 0 for control transfer, and PIPEa to PIPEe are general-purpose pipe regions that can be assigned to any end points.

In other words, with USB, end point 0 is set to be a dedicated end point for control transfer. It is therefore possible to prevent confusion in the user, by setting PIPE0 to be a dedicated pipe region for control transfer, as in this embodiment. It is also possible to modify the pipe region dynamically to correspond to the end points, by having PIPEa to PIPEe as pipe regions that can be assigned to any end points. This makes it possible to increase the degree of freedom of pipe transfer scheduling, thus enabling more efficient data transfer.

Note that the region size RSize of the buffer region (pipe region or end point region) of this embodiment is set by the maximum packet size MaxPktSize (generally speaking: page size) and the number of pages BufferPage (RSize=MaxPktSize×BufferPage). This makes it possible to set the region size and number of pages of the buffer region as required, enabling more efficient usage of the resources of the packet buffer 100.

The interface circuit 110 is a circuit that performs data transfer between a DMA (system memory) bus or CPU bus, which are other buses that differ from USB, and the packet buffer 100. This interface circuit 110 includes a DMA handler circuit 112 for performing DMA transfers between the packet buffer 100 and external system memory. It also includes a CPU interface circuit 114 for performing parallel I/O (PIO) transfers between the packet buffer 100 and an external CPU. Note that the CPU (processing section) could also be incorporated in the data transfer control device.

A clock controller 120 generates various clocks used within the data transfer control device, based on a built-in PLL or an external input clock.

4. Pipe Regions

Figure 5:
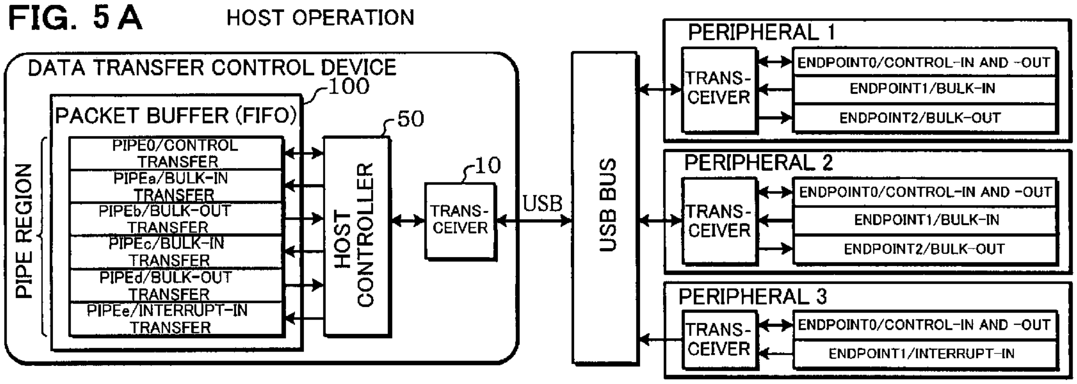
FIGS. 5A and 5B are illustrative of pipe regions and end point regions.
Figure 5:
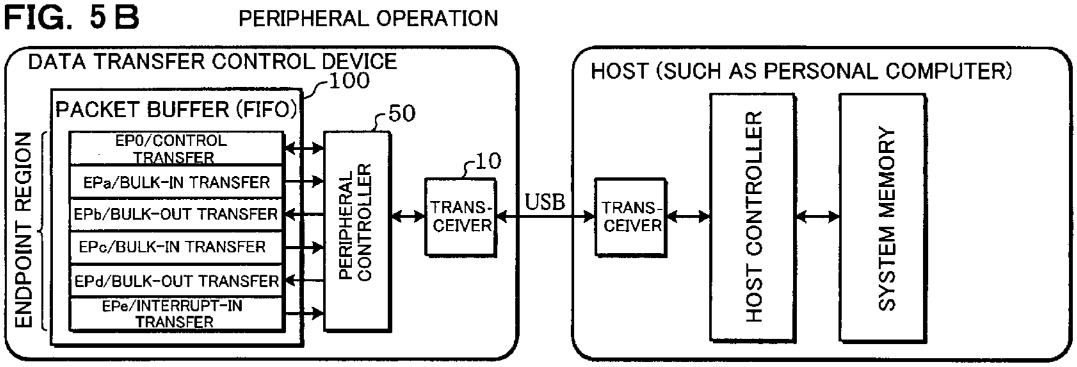

With this embodiment, pipe regions PIPE0 to PIPEe are allocated during host operation, as shown in FIG. 5A. Data is transferred between these pipe regions PIPE0 to PIPEe and end points in the peripheral.

In this case, the "pipe" of the pipe region of this embodiment has a slightly different meaning from the "pipe" defined by USB (a logical abstraction expressing a linkage between an end point on the device and software on the host, or a logical path).

A pipe region in accordance with this embodiment is allocated in the packet buffer 100 to correspond to each end point possessed by a peripheral connected by USB (bus), as shown in FIG. 5A. As shown in FIG. 5A by way of example, pipe region PIPEa corresponds to end point 1 (bulk IN) of peripheral 1 and pipe region PIPEb corresponds to end point 2 (bulk OUT) of peripheral 1. Similarly, pipe region PIPEc corresponds to end point 1 (bulk IN) of peripheral 2 and pipe region PIPEd corresponds to end point 2 (bulk OUT) of peripheral 2. Furthermore, PIPEe corresponds to end point 1 (interrupt IN) of peripheral 3. Note that PIPE0 is a pipe region that is dedicated to end point 0 for control transfer.

In the example shown in FIG. 5A, USB bulk IN transfer is done between pipe region PIPEa and end point 1 of peripheral 1 and bulk OUT transfer is done between PIPEb and end point 2 of peripheral 1. Similarly, bulk IN transfer is done between PIPEc and end point 1 of peripheral 2 and bulk OUT transfer is done between PIPd and end point 2 of peripheral 2. Furthermore, interrupt IN transfer is done between PIPEe and end point 1 of peripheral 3.

With this embodiment as configured above, any data transfer (isochronous transfer, bulk transfer, or interrupt transfer) can be done between a pipe region (general-purpose) and the corresponding end point.

With this embodiment, data of a given data unit (a data unit determined by the total size) is transferred between a pipe region and the corresponding end point. A data unit in this case could be considered to be a data unit for a transfer requested by an I/O request packet (IRP) or such a data unit that has been divided into a unit of a suitable size, by way of example. A data transfer of such a data unit (a series of transactions) with respect to an end point can be called a "pipe" in accordance with this embodiment. A region in which this "pipe" of data (transmission data or reception data) is stored forms a pipe region.

Once the transfer of a given data unit through a pipe region has ended, that pipe region can be released. The released pipe region can then be assigned to any end point. With this embodiment as configured above, the correspondences between pipe regions and end points can be changed dynamically.

When the device of this embodiment is operating as a peripheral, end point regions EP0 to EPe are allocated (set) in the packet buffer 100, as shown in FIG. 5B. Data is then transferred between these end point regions EP0 to EPe and the host (host controller or system memory).

With this embodiment as configured above, the buffer region of the packet buffer 100 is assigned as pipe regions during host operation or as end point regions during peripheral operation. This makes it possible to use the packet buffer 100 resources in common during host operation and during peripheral operation, enabling a saving in usable storage capacity of the packet buffer 100.

Note that the number of pipe regions and end point regions is not limited to six and thus can be any number.

5. Automatic Control Transfer

Four different transfer methods are defined under USB: isochronous transfer, bulk transfer, interrupt transfer, and control transfer. Of these, control transfer is a transfer method that supports communications relating to configuration, commands, and status between client software and functions.

This control transfer is configured of a setup stage in which the host sends a device request to the peripheral (device) a data stage in which data is transferred in the transfer direction specified by the device request, and a status stage that informs whether or not the data transfer succeeded. Each stage is configured of at least one transaction. In this case, a transaction is configured of a token packet, an optional data packet, and an optional handshake packet, and is a service with respect to an end point> This control transfer causes the execution of details such as the enumeration and configuration of the peripheral (device or end point).

One method of implementing the above described control transfer that could be considered is a method by which firmware operating on the CPU controls and manages all the control transfers. In other words, the firmware controls and manages data transfer in units of stages (transactions) of the setup stage, data stage, and status stage that form the control transfer.

However, control transfer is always issued at least during the enumeration of the peripheral (device) by the host, and it often happens that a plurality of control transfers (device requests) is performed. Moreover, the control transfer is configured of a plurality of sequential stages; the setup stage, data stage, and status stage. There is thus a technical problem with the above described method by which the firmware controls and manages data transfer in each stage, in that the processing load on the firmware (processing section) is heavy.

To solve this technical problem, this embodiment employs a method by which control transfer is done automatically by hardware circuitry. This automatic control transfer method is described below.

With this embodiment, the firmware first sets transfer condition information for control transfer in the transfer condition register (PIPE0 register) of the transfer condition register section 72 of FIG. 4. More specifically, the firmware sets device request data and the total size of transfer data for the data stage. More preferably, it sets information such as data stage present/absent information, the transfer direction in the data stage, and the maximum packet size.

In other words, USB determines whether or not there is a data stage, the transfer direction in the data stage, and the transfer direction in the status stage, uniquely by the type of device request, thus enabling the firmware (host software) to recognize those details. In addition, the control transfer stage has a sequential configuration. This embodiment concentrates on those two points to ensure that the host controller 50 can complete one control transfer by having the firmware issue just one setting (instruction). In other words, the firmware sets the device request data (command), the presence/absence of a data stage, and, if there is a data stage, the transfer direction, maximum packet size (data payload size), and the total size of transfer data for the data stage in the transfer condition registers (which could also be provided within the host controller 50), and instructs the start (mode) of automatic control transfer. When that happens those settings cause the host controller 50 (generally speaking: the transfer controller, data transfer control device, or hardware circuit; hereinafter the same) to perform the sequence of operations shown in FIG. 7.

In other words, if the start of automatic control transfer is instructed, the host controller 50 issues a setup stage transaction (token packet, data packet, and handshake packet). With this setup stage, the host controller 50 first generates a SETUP talk packet and transmits (issues) it to the peripheral. It then sends the peripheral the device request data packet shown by way of example in FIG. 6. When an acknowledgement (ACK) packet returns from the peripheral, the host controller 50 ends the setup stage.

Note that "H→P" denotes "transfer from host to peripheral" and "P→H" denotes "transfer from peripheral to host".

When the setup stage completes, the host controller 50 automatically issues a data stage transaction. Note that if "data stage absent" has been set, it automatically issues a status stage transaction.

In the data stage, the host controller 50 issues an IN transaction if "transfer direction IN" has been set. In this IN transaction, the host controller 50 transmits an IN token packet to the peripheral. When it receives a data packet from the peripheral, it transmits an ACK handshake packet to the peripheral. It repeats this IN transaction until the total size of data that was set by the firmware has been received, which ends the data stage.

If "transfer direction OUT" has been set, on the other hand, the host controller 50 issues an OUT transaction. In this OUT transaction, the host controller 50 transmits an OUT token packet to the peripheral and transmits a data packet to the peripheral. It then receives an ACK handshake packet from the peripheral. It repeats this OUT transaction until the total size of data has been transmitted to the peripheral, ending the data stage.

When the data stage has ended or when "data stage absent" was set by the firmware, the host controller 50 issues a status stage. If the data stage was an IN transaction, the host controller 50 transmits an OUT token packet then transmits a zero-length data packet to the peripheral. When it receives an ACK handshake packet from the peripheral, the host controller 50 ends the status stage.

If the data state was an OUT transaction, on the other hand, the host controller 50 transmits an IN token packet to the peripheral. When it receives a zero-length data packet from the peripheral, it transmits an ACK handshake packet to the peripheral and ends the status stage.

Examples of the signal waveforms during automatic control transfer are shown in FIGS. 8A, 8B, and 8C.

FIG. 8A shows examples of the signal waveforms during the transmission of data from the host (host controller) to the peripheral (during write transfer).

When the firmware performs a start instruction for automatic transfer by PIPE0 for control transfer, Pipe0TranGo (a transfer request signal for PIPE0 from the firmware) becomes active as shown at C1 in FIG. 8A. This starts the automatic control transfer by the host controller 50. A setup stage SETUP transaction, data stage OUT transaction, and status stage IN transaction are then issued as shown at C2, C3, and C4, and packet transfer is done for each transaction. When the status stage completes, CTLTranComp (control transfer end notification signal to the firmware) becomes active, as shown at C5, and the end of all stages of the control transfer is posted to the firmware by this CTLTranComp interrupt.

When the status stage transaction ends in the above-configured embodiment, an interrupt is generated to the firmware. The firmware can determine whether the control transfer has ended by checking the cause (status) of that interrupt.

Thus this embodiment makes it possible for the firmware to have no connection with the automatic control transfer after setting transfer condition information (such as device request data, total size, and maximum packet size), up until the generation of the interrupt (CTLTranComp). This enables a huge reduction in the processing load on the firmware.

Note that if a stall is received from the peripheral (end point) as a result of the transmission of an illegal request or the like, the automatic control transfer is halted at that point and an interrupt is generated to the firmware.

In other words, if it is impossible for the peripheral (device) to transmit/receive data or if a control transfer request is not supported by that peripheral, this stall is transferred from the peripheral to the host. In such a case, this embodiment enables the firmware to learn of the stall reply from the interrupt, making it possible to invalidate the control transfer.

FIG. 8B shows examples of the signal waveforms when the host receives data from the peripheral (during write transfer) In this case, the data stage is an IN transaction, as shown in C6. The status stage becomes an OUT transaction, as shown at C7.

FIG. 8C shows examples of signal waveforms when "data stage absent" has been set, In this case, the data stage is omitted, as shown at C8. The status stage becomes an IN transaction, as shown at C9.

A detailed example of the signal waveforms of the setup stage is shown in FIG. 9A. When PipeTranGo (the transfer request signal from the HC sequence management circuit within the host controller 50) becomes active at D1, the host transmits a token packet and a device request (request command) data packet to the peripheral. This device request data is set by the firmware in the transfer condition registers. When a handshake packet (ACK) is received from the peripheral, TranCmpACK becomes active at D2. This completes the setup stage.

A detailed example of the signal waveforms of the data stage during data transmission is shown in FIG. 9B. When PipeTranGo becomes active as D3, the host transmits a token packet and data packet to the peripheral. When a handshake packet (ACK) is received from the peripheral, TranCmpACK becomes active at D4.

NextTotalSize (remaining data size=the total size of transfer data−transferred size) is not zero at D5. Therefore, PipeTranGo becomes active at D6 and the host transmits a token packet and data packet to the peripheral. If NextTotalSize is zero after the handshake packet (ACK) is received from the peripheral, as shown at D7, the data stage completes.

A detailed example of the signal waveforms of the data stage during data reception is shown in FIG. 9C. This case differs from that of FIG. 9B in that the host receives a data packet from the peripheral, as shown at D8 and D9, and host transmits a handshake packet (ACK) to the peripheral, as shown at D10 and D11.

A detailed example of the signal waveforms of the status stage during data transmission or when there is no data stage is shown in FIG. 10A. When PipeTranGo becomes active at E1, the host transmits a token packet to the peripheral and receives a zero-length data packet (empty packet) from the peripheral. The host then transmits a hand shake packet (ACK) to the peripheral and TranCmpACK becomes active at E2. This ends the status stage.

A detailed example of the signal waveforms of the status stage during data reception data is shown in FIG. 10B. This case differs from that of FIG. 10A in that the host transmits a token packet and zero-length data packet to the peripheral, as shown at E3 and E4, and the host receives a handshake packet (ACK) from the peripheral, as shown at E5.

6. Firmware Processing

The description now turns to a detailed processing example of the firmware (processing section).

Figure 11:
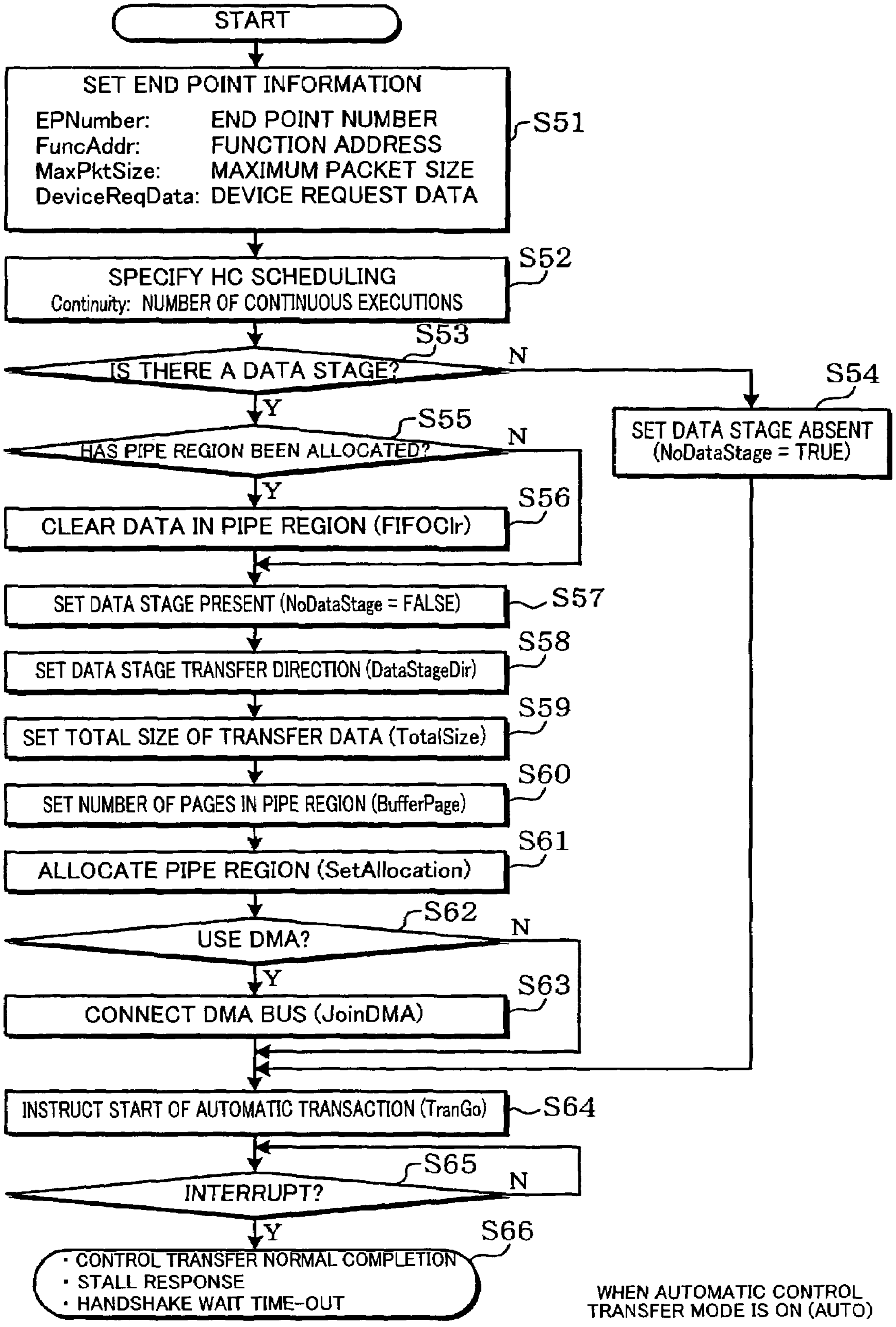

A flowchart of a processing example of the firmware when the automatic control transfer mode (EnAutoMode) has been set to on is shown in FIG. 11.

First of all, the firmware sets end point (transfer condition) information in a transfer condition register (step S51). In other words, it sets data such as the end point number (EPNumber), function address (FuncAddr), maximum packet size (MaxPktSize), and device request data (DeviceReqData). It also specifies the HC scheduling (number of continuous executions: Continuity) (step S52).

It then determines whether or not there is a data stage (step S53). If there is no data stage, it sets that there is no data stage (NoDataStage=TRUE) (step S54) and jumps to step S64.

If there is a data stage, on the other hand, it confirms whether or not a pipe (buffer) region has already been allocated (step S55) and, if it has been allocated, it instructs (FIFOClr) the clearing of data in the pipe region (step S56).

It then sets the presence of the data stage (NoDataStage=FALSE) (step S57). It also sets the data stage transfer direction (DataStageDir) and the total size of transfer data (TotalSize) (steps S58 and S59).

Note that steps S51 to S59 can be done in any order.

It then sets the number of pages (BufferPage) of the pipe (buffer) region and instructs (SetAllocation) allocation of the pipe region (steps S60 and S61). It determines whether or not DMA is to be used and, if it is to be used, instructs (JoinDMA) connection to the DMA bus (steps S62 and S63).

It then instructs the start of the automatic transaction (TranGo) (step S64). It waits for the generation of an interrupt (step S65), then performs processing such as normal completion, STALL response, or handshake wait time-out (step S66).

When the firmware performs the settings of steps S51 to S64 of FIG. 11 in accordance with this embodiment, the host controller 50 (transfer controller) sequentially issues the setup stage, data stage, and status stage for the control transfer automatically. When the final status stage completes, the host controller 50 generates an interrupt, which prompts the firmware to perform step S66.

If DMA transfer is utilized, therefore, the firmware can be used for other processing during the period after the settings of steps S51 to S64 or FIG. 11 until the generation of the interrupt. This makes the processing of the firmware more efficient.

Figure 12:
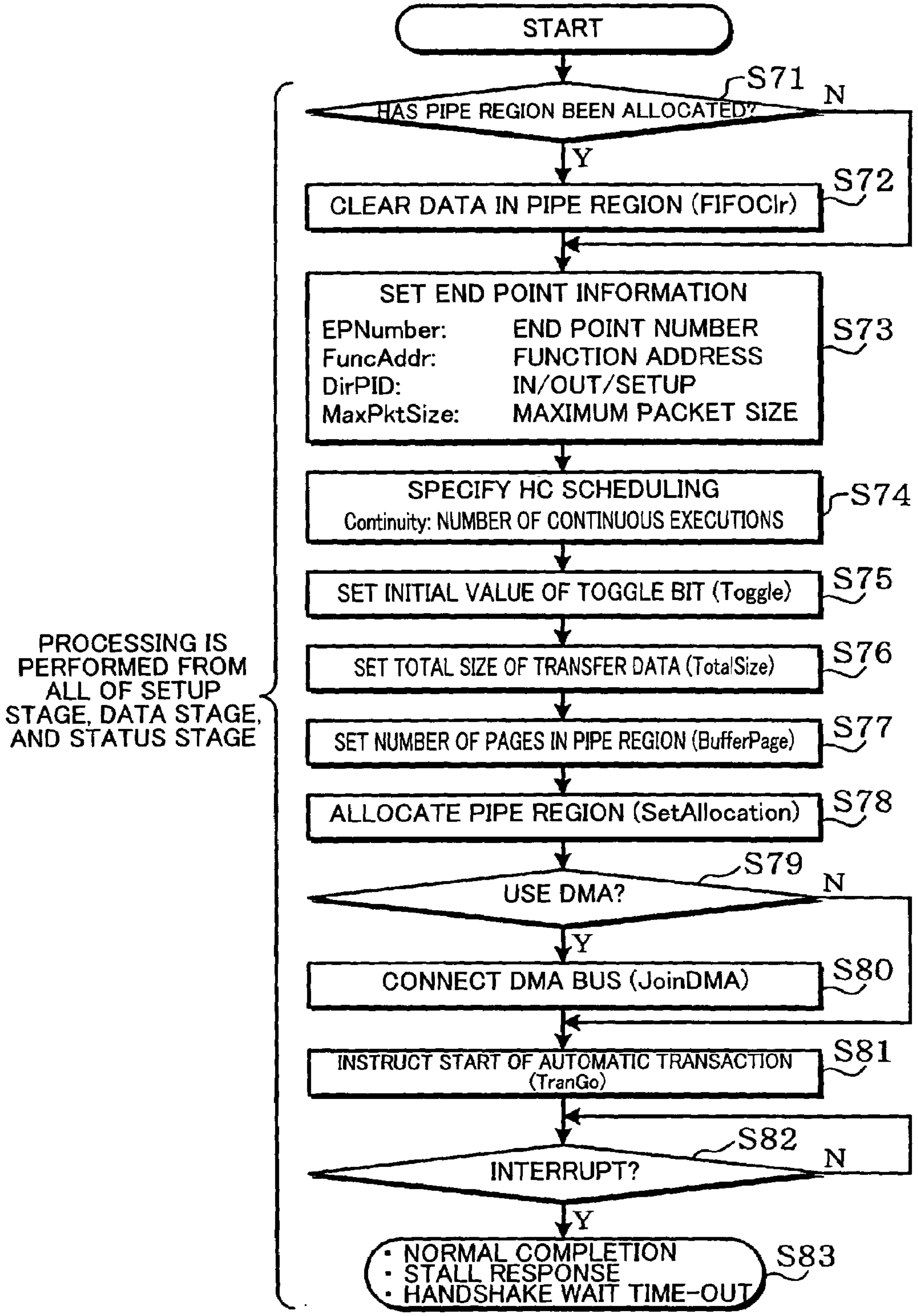
FIG. 12 is a flowchart of an example of firmware processing when automatic control transfer mode is off.

A flow chart of the processing of the firmware when automatic control transfer mode (EnAutoMode) has been set to off is shown in FIG. 12, by way of example. When automatic control transfer mode has been set to off, the firmware must perform the processing from all of the setup stage, data stage, and status stage, as shown by steps S71 to S83 of FIG. 12. It is therefore necessary to perform the processing of steps S71 to S83 of FIG. 12 three times (twice if there is no data stage) for each control transfer. For that reason, a problem arises in that the processing load on the firmware is extremely large.

This embodiment makes it possible to solve this problem by turning the automatic control transfer mode (EnAutoMode) on.

Note that this embodiment states that the firmware sets data such as data stage present/absent information and the transfer direction in the data stage in the transfer condition registers, but it is also possible to obtain this information by having a decoder circuit decode the device request command. In such a case, the settings of steps S54, S57, and S58 of FIG. 11 (the data stage present/absent and transfer direction settings) are not necessary.

7. Circuit Example

Figure 13:
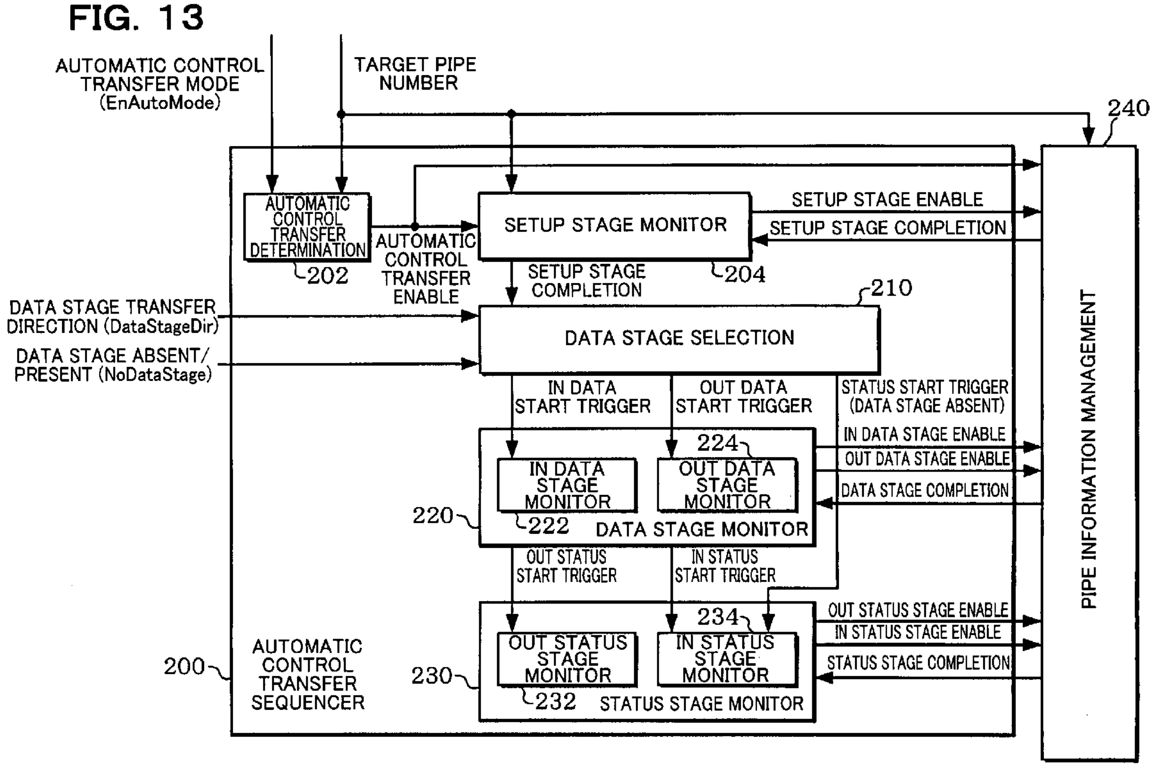
FIG. 13 shows an example of a circuit that implements automatic control transfer.
Figure 18A:
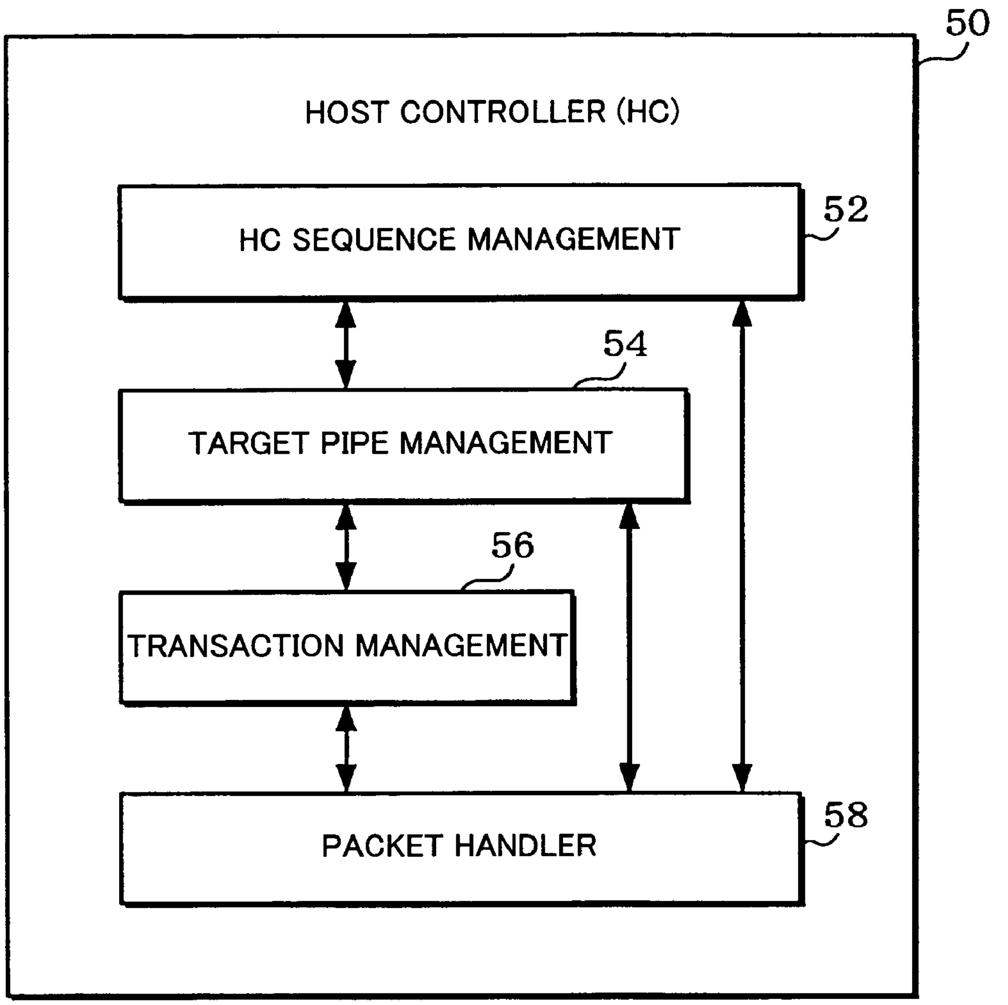
FIGS. 18A and 18B show detailed examples of the configurations of the host controller and the peripheral controller.

An example of a circuit that implements automatic control transfer is shown in FIG. 13. This circuit is provided within a target pipe management circuit 54 of the host controller 50, as shown in FIG. 18A.

A pipe information management circuit 240 is a circuit that manages information about the pipes that are targets. If the target pipe is instructed by an HC sequence management circuit 52 of FIG. 18A, this pipe information management circuit 240 selects the corresponding pipe information from the transfer condition registers of the register section 70 and passes it to a transaction management circuit 56 and a packet handler circuit 58.

Figure 7:
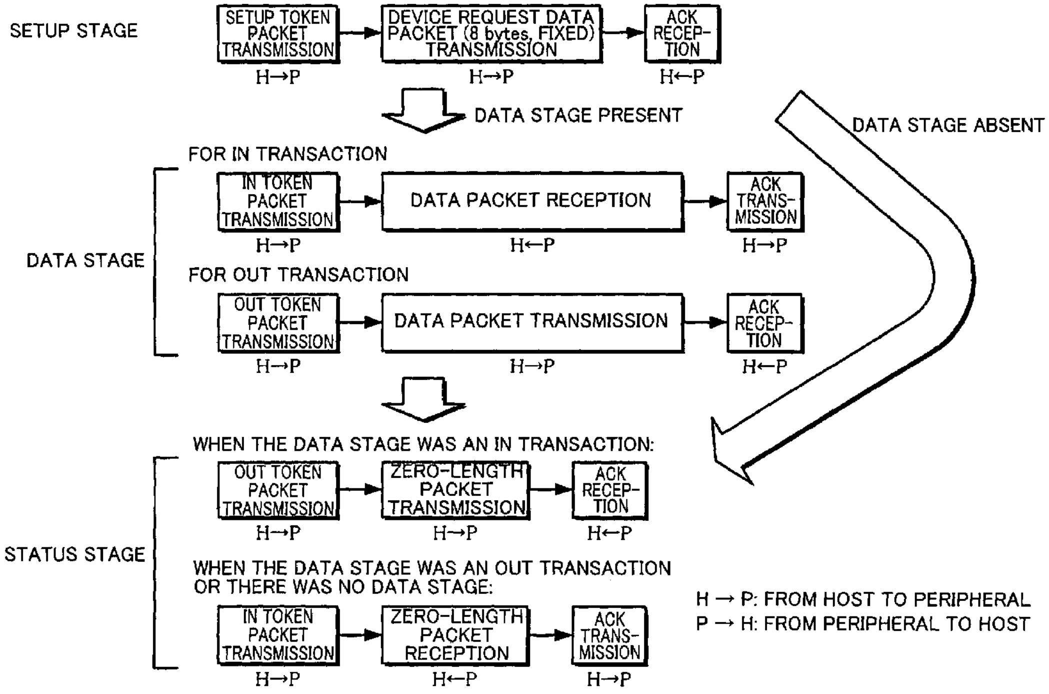
FIG. 7 is illustrative of the automatic control transfer method of this embodiment.

An automatic control transfer sequencer 200 is a circuit that manages the sequence of automatic control transfer that was described with reference to FIG. 7. Before the pipe information is passed to the transaction management circuit 56 and the packet handler circuit 58, this automatic control transfer sequencer 200 performs processing to add automatic control transfer information (information necessary for each stage of the automatic control transfer) to that pipe information.

The automatic control transfer sequencer 200 includes an automatic control transfer determination circuit 202, a setup stage monitor circuit 204, a data stage selection circuit 210, a data stage monitor circuit 220, and a status stage monitor circuit 230. Note that the automatic control transfer sequencer 200 need not necessarily include all of these circuit blocks and some of them could be omitted.

The automatic control transfer determination circuit 202 receives the automatic control transfer mode (EnAutoMode) signal and the target pipe number, and determines whether or not to perform automatic control transfer with respect to that pipe. If the automatic control transfer mode signal is active (auto) and the target pipe is the control transfer PIPE0, for example, it decides to perform automatic control transfer and make the automatic control transfer enable signal go active. This instructs the start of automatic control transfer.

The setup stage monitor circuit 204 is a circuit that instructs the start of the setup stage transaction when the start of automatic control transfer has been instructed.

In other words, when the automatic control transfer enable signal becomes active, the setup stage monitor circuit 204 makes the setup stage enable signal go active to instruct the start of the setup stage transaction for that pipe (PIPE0). When this setup stage completes, it makes the setup stage completion signal go active.

The data stage selection circuit 210 selects one of the data stage IN transaction, the data stage OUT transaction, and "data stage absent", based on the transfer direction in the data stage (DataStageDir) and the data stage present/absent information (NoDataStage).

In other words, if the transfer direction is "IN" and "data stage present" is set, the data stage selection circuit 210 makes the IN data start trigger go active to select the execution of an IN transaction. If the transfer direction is "OUT" and "data stage present" is set, if makes the OUT data start trigger go active to select the execution of an OUT transaction. If "data stage absent" is set, on the other hand, it makes the status start trigger go active, to bypass the data stage.

If a data stage IN transaction has been selected, the data stage monitor circuit 220 instructs the start of an IN transaction, whereas if a data stage OUT transaction has been selected it instructs the start of an OUT transaction. This data stage monitor circuit 220 includes an IN data stage monitor circuit 222 and an OUT data stage monitor circuit 224.

In this case, if the IN data start trigger becomes active, the IN data stage monitor circuit 222 makes the IN data stage enable signal go active to instruct the start of the IN transaction. When the data stage completes, it makes the OUT status start trigger go active.

When the OUT data start trigger becomes active, the OUT data stage monitor circuit 224 makes the OUT data stage enable signal active, to instruct the start of an OUT transaction. When the data stage completes, it makes the IN status start trigger active.

The status stage monitor circuit 230 is a circuit that instructs the start of a status stage OUT transaction when the data stage IN transaction has ended, and instructs the start of a status stage IN transaction when the data stage OUT transaction has ended or when "data stage absent" was selected. This status stage monitor circuit 230 includes an OUT status stage monitor circuit 232 and an IN status stage monitor circuit 234.

In this case, the OUT status stage monitor circuit 232 makes the OUT status stage enable signal go active to instruct the start of a status stage OUT transaction when the OUT status start trigger becomes active.

The IN status stage monitor circuit 234 makes the IN status stage enable signal go active to instruct the start of a status stage IN transaction when the IN status start trigger becomes active.

The use of the circuit configuration shown in FIG. 13 makes it possible to issue a string of transactions for the setup stage, data stage, and status stage automatically, without involving the firmware.

8. Transfer Condition Registers (Common Registers)

Figure 14:
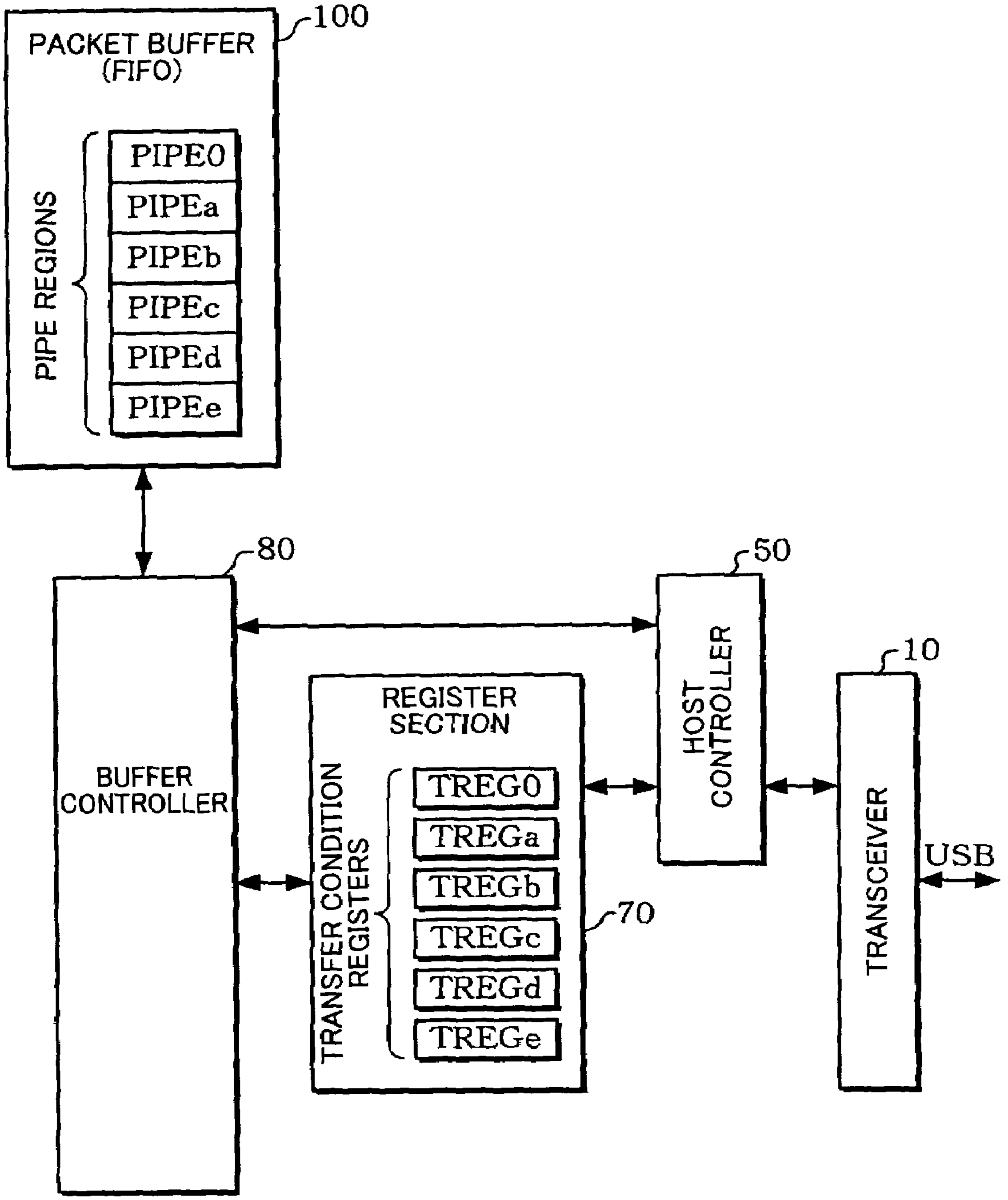
FIG. 14 is illustrative of the operation of the data transfer control device as a host.

When the device of this embodiment is operating as a host, transfer condition information (such as transfer direction, transfer type, maximum packet size, or number of pages) for data transfer to be performed between pipe regions PIPE0 to PIPEe and end points is set in transfer condition registers TREG0 to TREGe, as shown in FIG. 14. In other words, transfer condition information for PIPE0, PIPEa, PIPEb, PIPEc, PIPEd, and PIPEe is set (stored) in TREG0, TREGa, TREGb, TREGc, TREGd, and TREGe. This setting could be done by firmware (the CPU), by way of example.

The host controller 50 (generally speaking: a transfer controller) initiates each transaction with respect to an end point, based on the transfer condition information that has been set in the transfer condition registers TREG0 to TREGe. Data is transferred (in packets) automatically between each pipe region and the corresponding end point.

With the thus-configured embodiment, a transfer condition register is provided for each pipe region (buffer region) and pipe transfer for each pipe region (transfer of a given data unit) is done automatically by the host controller 50, based on the transfer condition information that has been set in these transfer condition registers. The firmware (driver or software) therefore need not be involved in data transfer control after setting the transfer condition information in the transfer condition registers, until data transfer is complete. An interrupt is generated when the pipe transfer of the given data unit is complete, to inform the firmware than the transfer is complete. This enables a large reduction in the processing load on the firmware (CPU).

Note that in this embodiment, PIPE0 is set to be a dedicated pipe region for end point 0 (the control transfer end point) and PIPEa to PIPEe are set to pipe regions that can be assigned to any end points. In this case, this embodiment automatically issues a control transfer transaction such as that described with reference to FIG. 7, based on transfer condition information that has been set in the transfer condition register TREG0 corresponding to PIPE0 (the control transfer pipe region). Data is then transferred automatically between PIPE0 and end point 0.

Figure 15:
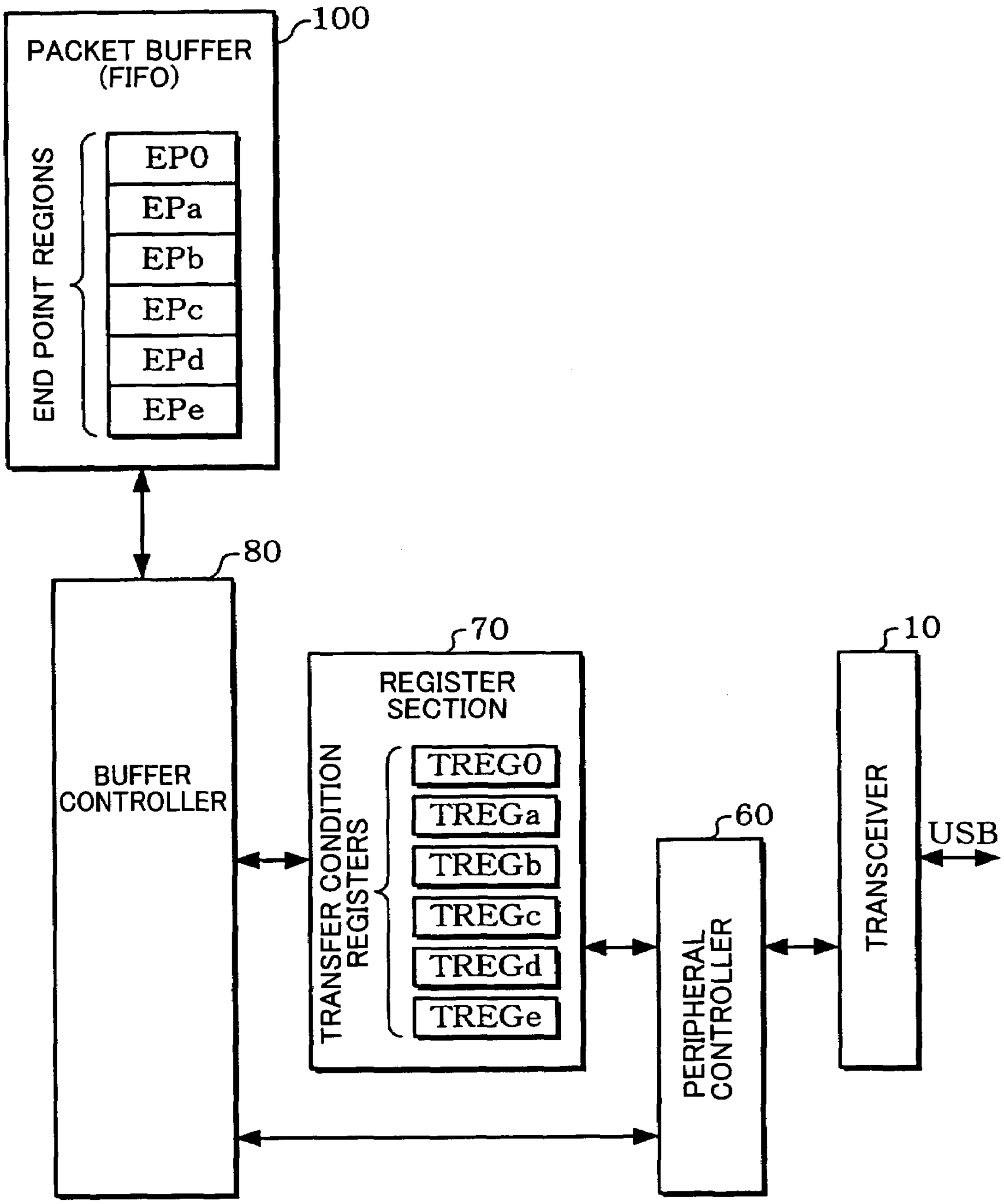
FIG. 15 is illustrative of the operation of the data transfer control device as a peripheral.

Note that when the device of this embodiment is operating as a peripheral, transfer condition information (such as transfer direction, transfer type, maximum packet size, or number of pages) for data transfer to be performed between the end point regions EP0 to EPe and the host is set in the transfer condition registers TREG0 to TREGe, as shown in FIG. 15. The peripheral controller 60 (generally speaking: a transfer controller) performs data transfer between the end point regions and the host, based on the transfer condition information that has been set in the transfer condition registers TREG0 to TREGe.

With the thus-configured embodiment, the transfer condition registers TREG0 to TREGe are used in common during operation as host and during operation as peripheral. This makes it possible to save on resources for the register section 70, thus making the data transfer control device smaller.

An example of the configuration of the registers of the register section 70 is shown in FIG. 16. Note that some of the registers of the register section 70 could be included within individual blocks (such as OTGC, HC, PC, or Xcvr).

As shown in FIG. 16, the transfer condition registers (TREG0 to TREGe) of the register section 70 include HC/PC common registers (common transfer condition registers) used both during host operation (HC, PIPE) and during peripheral operation (PC, EP). They also include HC (PIPE) registers (transfer condition registers for the host) that are used only during host operation. They further include PC (EP) registers (transfer condition registers for the peripheral) that are used only during peripheral operation. In addition, they include access control registers which are registers for controlling access to the packet buffer (FIFO) and which are used both during host operation and during peripheral operation.

While a dual-role device is operating as a host, for example, the host controller 50 (HC) transfers data (packets), based on transfer condition information set in the HC/PC common registers and the HC registers.

During operation as a peripheral, on the other hand, the peripheral controller 60 (PC) transfers data (packets), based on transfer condition information set in the HC/PC common registers and the PC registers.

During both host operation and peripheral operation, the buffer controller 80 performs access control (such as initiation of read/write addresses, data read/write, access arbitration) to the packet buffer 100, based on the common access control registers.

The data transfer direction (such as IN, OUT, or SETUP) the transfer type (transaction type, such as isochronous, bulk, interrupt, or control), end point number (the number linked to an endpoint in a USB device), and the maximum packet size (maximum payload size of a packet that an endpoint can transmit or receive, the page size) are set in the HC/PC common registers of FIG. 16. In addition, the number of pages in the buffer region (pipe region or end point region) (number of screens of the buffer region) is set therein. Furthermore, information that instructs the presence or absence of a DMA connection (presence or absence of the use of DMA transfer by the DMA handler circuit 112) is set therein.

The token issue period for interrupt transfer (the period or interval at which interrupt transactions are activated) is set in the HC (PIPE) registers. The number of continuous executions of transactions (information that sets transfer ratios between the pipe regions, the number of continuous executions of transactions for each pipe region) is also set. The function address (USB address of a function having an end point) and the total size of the transfer data (total size of data to be transferred through each pipe region, in data units such as IRP) are also set. The automatic transaction start instruction (a start instruction for automatic transaction with respect to the host controller) is also set. The automatic control transfer mode instruction (an instruction for a mode that automatically initiates the control transfer setup stage, data stage, and status stage) is set.

The end point enable (an instruction that enables or disables an end point) and a handshake specification (a specification of the handshake to be used for each transaction) are set in the PC (EP) registers.

The buffer and I/O port (the I/O port for PIO transfer by the CPU) is set in the common access control registers for packet buffer (FIFO). A buffer full/empty flag (notification of whether each buffer region is full or empty) and a buffer remaining data size (the remaining data size for each buffer region) are also set.

The register section 70 includes registers such as interrupt-related registers, block-related registers, and a DMA control register.

The interrupt-related registers include an interrupt status register that indicates the interrupt status (cause) to the CPU, and an interrupt enable register that sets enabled/disabled (non-masked, masked) for interrupts. Note that the interrupts include interrupts relating to the OTG controller 20, to the host controller 50, and to the peripheral controller 60.

The block-related registers include an inter-block common register that is used in common between blocks and block registers that are used within the blocks (Xcvr, OTGC, HC, and PC).

The inter-block common register is a register that instructs the reset of each block. The block registers include a register for controlling the transceiver 10 (Xcvr), a state command register for the OTG controller 20 (OTGC), a state command register for the host controller 50 (HC), and a register for setting frame number.

With this embodiment as described above, registers used both during host operation and during peripheral operation (HC/PC common registers and common access control registers) are provided in the register section 70. This enables a reduction in size of the register section 70, in comparison with the case in which completely separate registers are provided for when the device is operating as a host and when it is operating as a peripheral. Access addresses to the common registers, as seen from the firmware (driver) operating on the CPU, can be made the same for host operation and peripheral operation. The firmware can therefore use the same addresses for managing these common registers, enabling a simplification of the firmware processing.

Since HC registers and PC registers are provided, specific transfer conditions can be set for host operation (PIPE) transfer and peripheral operation (EP) transfer. For example, it is possible to issue the interrupt transfer token at any desired timing during host operation, by setting the token issue period. It is also possible to set the transfer ratios between pipe regions as required during host operation, by setting the numbers of continuous executions. Similarly, it is possible to set any data size to be transferred automatically through a pipe region during host operation, by setting the total size therefor. The firmware is configured in such a manner that it can instruct the start of automatic transactions and instruct the turning on and off of automatic control transfer mode, during host operation.

9. Detailed Configurational Examples of Blocks

The description now turns to details of the configurations of the various blocks.

9.1 OTG Controller

Figure 17:
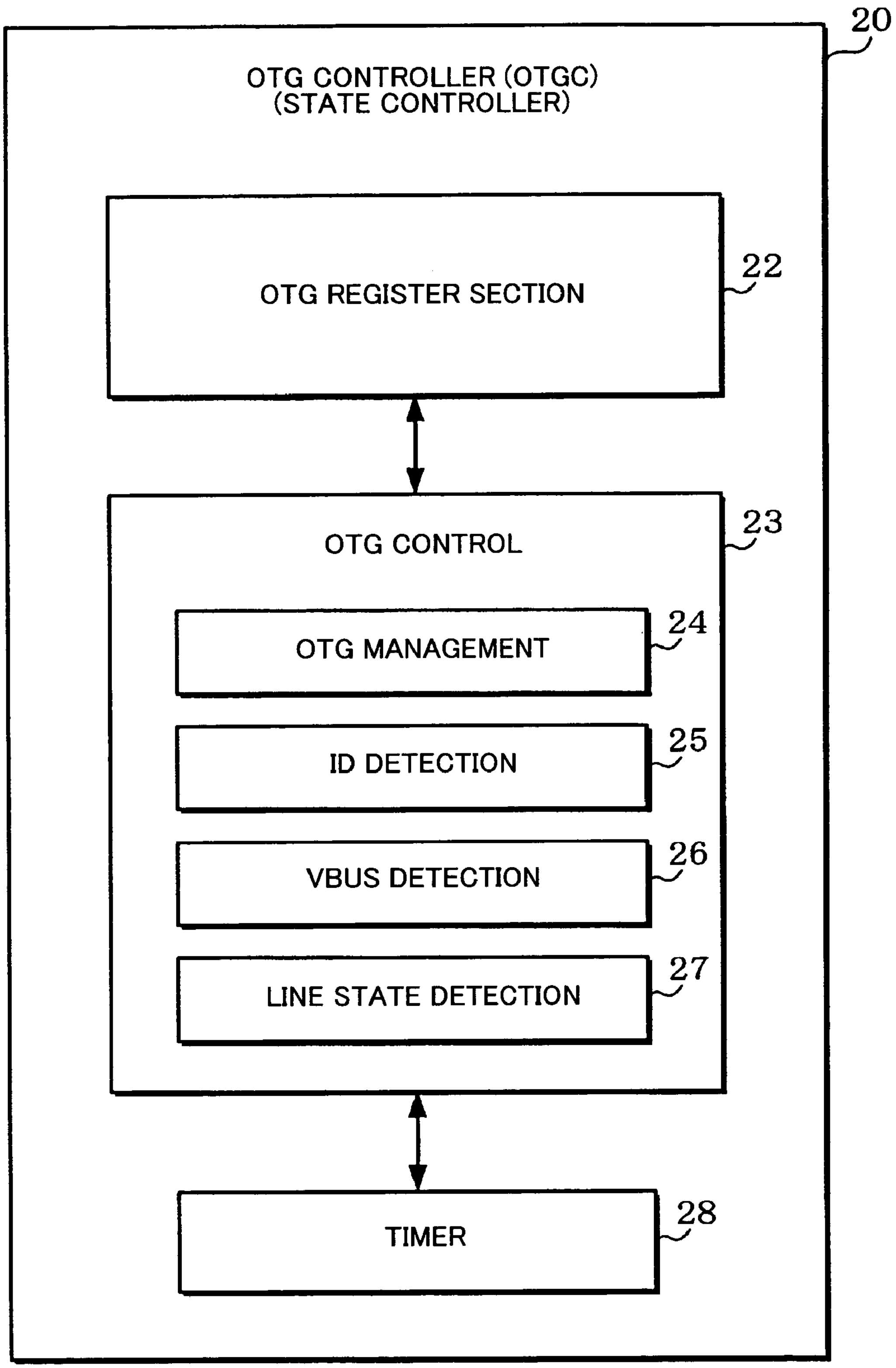
FIG. 17 shows a detailed example of the configuration of the OTG controller.

An example of the configuration of the OTG controller 20 is shown in FIG. 17.

The OTG controller 20 includes an OTG register section 22. This OTG register section 22 includes monitor and control registers for the OTG controller 20. It also includes a circuit that decodes OTG state commands that are written by the firmware (CPU).

The OTG controller 20 also includes an OTG control circuit 23. This OTG control circuit 23 includes an OTG management circuit 24 that manages the OTG state, an ID detection circuit 25 that detects the voltage level of the ID pin, a VBUS detection circuit 26 that detects the voltage level of VBUS, and a line state detection circuit 27 that DP and DM line states.

The OTG controller 20 also includes a timer 28 that measures time, which is one transition determination condition for OTG states.

Information to be detected for changing the OTG state is ID, the VBUS voltage level, and the DP/DM line state. The OTG controller 20 of this embodiment detects this information and transfers it to the firmware (CPU) via monitor registers.

The firmware changes its own state, based on the thus-detected information, and uses the OTG state command to inform the OTG controller 20 of the next state to change to.

The OTG controller 20 decodes the OTG state command then performs VBUS drive control and connection control over the pull-up/pull-down resistors, based on the decoded result, to implement the SRP or HNP described with reference to FIGS. 2A and 2B.

With this embodiment as described above, the OTG controller 20 is in charge of OTG control in each state so that the firmware can concentrate on state transition management. As a result, the processing load on the firmware (CPU) can be reduced in comparison with the case in which all state control is implemented by the firmware, and it is also possible to develop efficient firmware.

Note that the determination of OTG state transitions could be done by hardware circuitry, not the firmware. Alternatively, substantially all of the processing of the OTG controller 20 (such as processing other than VBUS control, pull-up/pull-down resistor control, ID detection, VBUS detection, and line state detection) could be implemented by firmware (software).

9.2 Host Controller and Peripheral Controller

An example of the configuration of the host controller 50 is shown in FIG. 18A.

The host controller 50 includes the HC sequence management circuit 52. This HC sequence management circuit 52 performs functions such as arbitration of pipe transfer (data transfer using the pipe region), time management, scheduling of pipe transfer, and re-transmission management.

More specifically, the HC sequence management circuit 52 instructs the transmission of the frame number count and a start-of-frame (SOF) packet. It performs processing to ensure that isochronous transfer is executed preferentially at the start, and processing to ensure that interrupt transfers are handled preferentially after isochronous transfers. It also processes each pipe transfer instruction in accordance with the pipe transfer sequence. Furthermore, it manages the number of continuous executions of transactions and confirms the remaining frame time. In addition, it performs processing to cope with handshake packets (ACK or NAK) returning from the peripheral. It also performs error processing during transaction execution.

The host controller 50 includes the target pipe management circuit 54. This target pipe management circuit 54 performs processing such as the handling of transfer condition information that has been set in the transfer condition registers of the register section 70.

More specifically, the target pipe management circuit 54 selects transfer condition information and creates interrupt signals. After automatic transaction start has been instructed, it loads the total size of transfer data for that pipe region. It then performs count processing (decrementation) of the remaining transfer data size. It also confirms the state of the buffer (FIFO) region during the transmission/reception of data to the buffer controller 80. It also instructs the transaction management circuit 56 to perform transfers. Furthermore, it determines the reception of an unexpected short packet or the reception of a packet of larger than the maximum packet size. If a mode in which a zero-length packet is transferred automatically has been set, it instructs the transaction management circuit 56 to transmit the final zero-length packet. It also manages the sequencing for automatic control transfer mode.

The host controller 50 includes the transaction management circuit 56. This transaction management circuit 56 classifies transfer packets and manages the transfer sequence (transaction sequence management). It also monitors for time-out. Furthermore, it performs transaction end notification processing.

The host controller 50 includes the packet handler circuit 58. This packet handler circuit 58 creates or analyzes packets. It also performs PID checks and decodes/encodes CRC bits. It reads or writes the payloads of packets in the buffer region, and transmits SOF packets. It also counts the transmission/reception data.

Figure 18B:
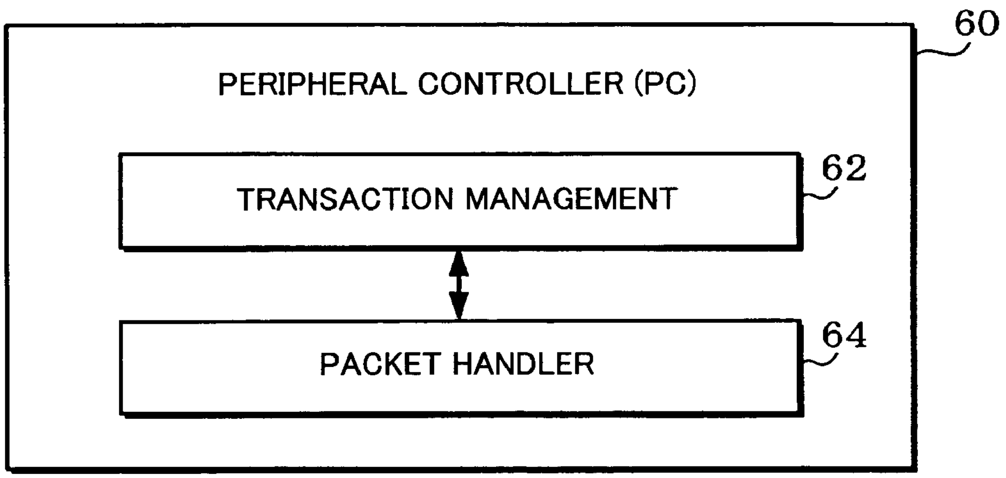

An example of the configuration of the peripheral controller 60 is shown in FIG. 18B.

The peripheral controller 60 includes a transaction management circuit 62 and a packet handler circuit 64. The transaction management circuit 62 and the packet handler circuit 64 perform substantially the same processing as the transaction management circuit 56 and the packet handler circuit 58 of the host controller 50.

9.3 Buffer Controller

Figure 19:
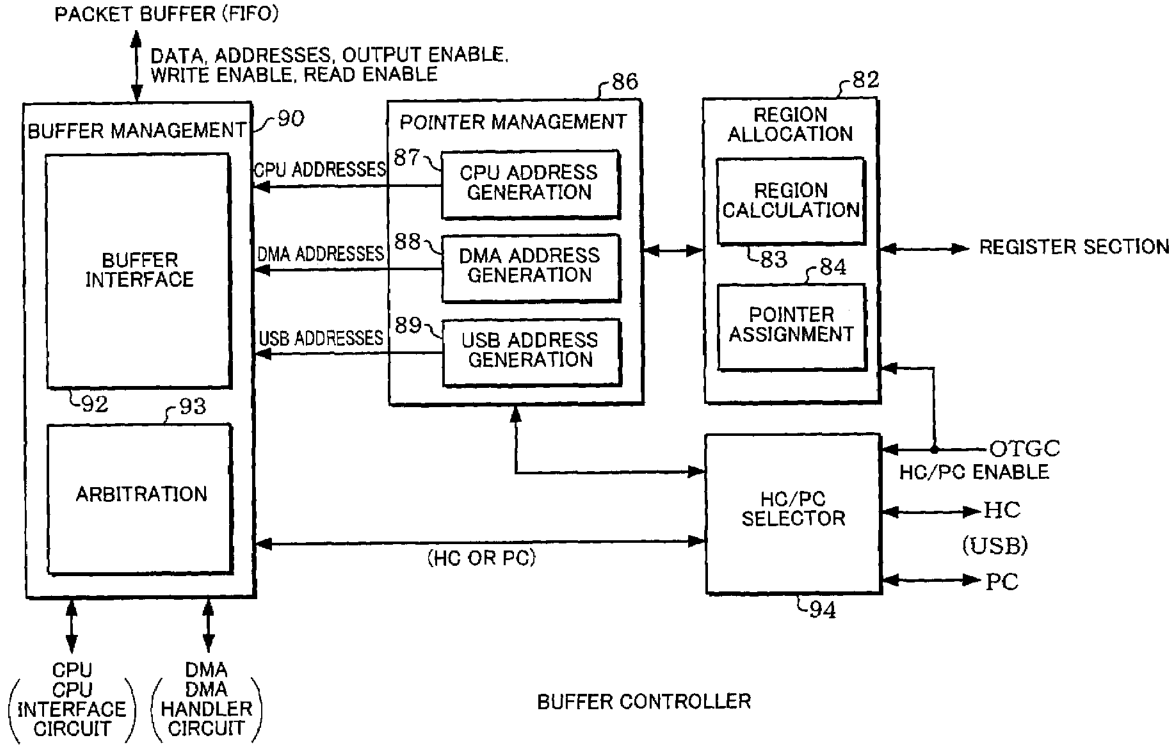
FIG. 19 shows a detailed example of the configuration of the buffer controller.

An example of the configuration of the buffer controller 80 is shown in FIG. 19.

The buffer controller 80 includes a region allocation circuit 82. This region allocation circuit 82 is a circuit that allocates the buffer region in the packet buffer 100 (a region in which pipe regions are set during host operation or end point regions are set during peripheral operation).

The region allocation circuit 82 includes a region calculation circuit 83. This region calculation circuit 83 is a circuit that calculates the region size, start address, and end address of the buffer region, based on the maximum packet size (generally speaking: the page size) and the number of pages.

Figures 20A, 20B, 20C:
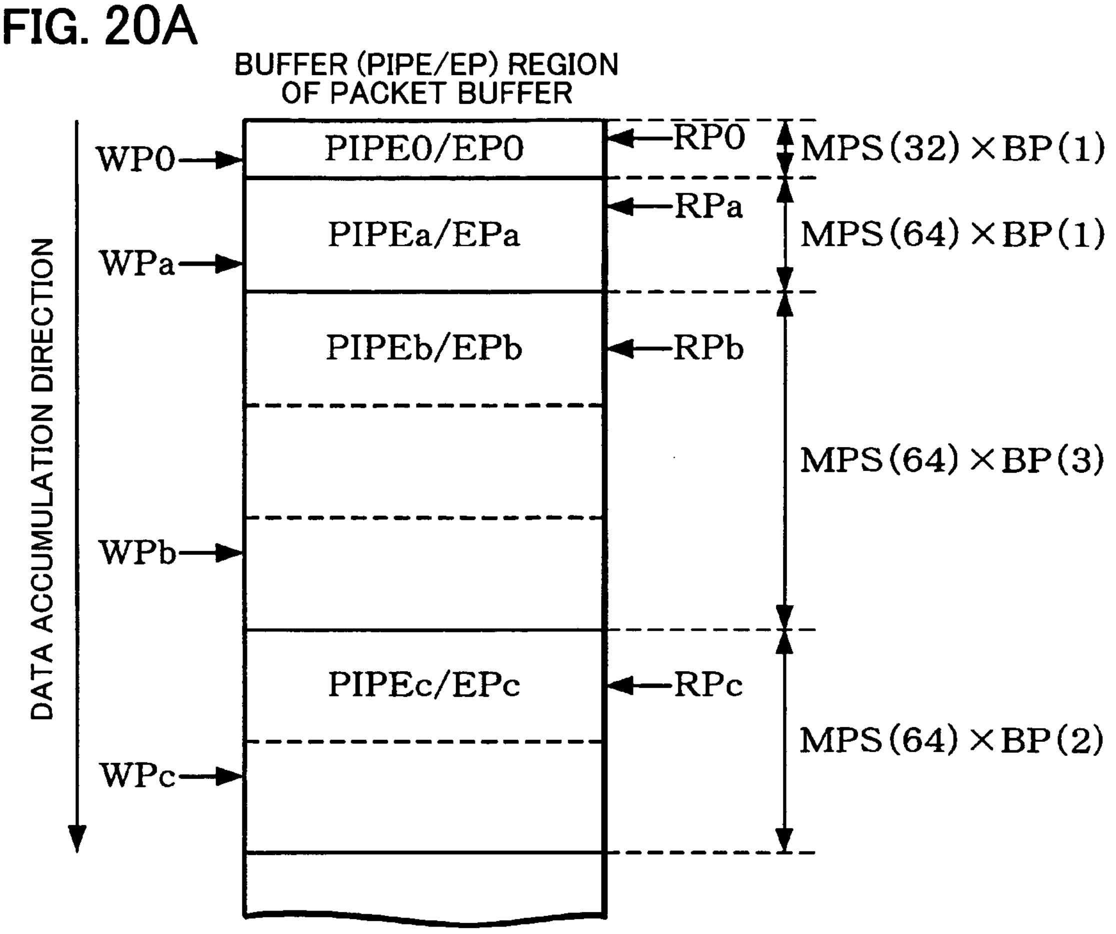
FIGS. 20A, 20B, and 20C are illustrative of the region allocation method and the pointer assignment method.

Assume, by way of example, that a maximum packet size (MaxPktSize) of 32, 64, 64, and 64 bytes is set for each of the buffer regions PIPE0/EP0, PIPEa/EPa, PIPEb/EPb, and PIPEc/EPc shown in FIG. 20A and the number of pages (BufferPage) is set to 1, 1, 3, and 2 pages, respectively. The region calculation circuit 83 calculates the region sizes, start addresses, and end addresses of these buffer regions PIPE0/EP0 to PIPEc/EPc, based on data such as these maximum packet sizes and numbers of pages. In the example shown in FIG. 20A, the region sizes of PIPE0/EP0, PIPEa/EPa, PIPEb/EPb, and PIPEc/EPc are calculated to be 32 ($=32\times1$), 64 ($=64\times1$), 192 ($=64\times3$), and 128 ($=64\times2$) bytes, respectively.

A pointer assignment circuit 84 is a circuit that assigns write pointers WP (WP0, WPa, WPb, WPc) and read pointers RP (RP0, RPa, RPb, RPc) for each buffer region, to DMA pointers, CPU pointers, and USB pointers.

For data transmission (transfer of data from the DMA or CPU to the USB side through the packet buffer 100) when DMA transfer is used, as shown in FIG. 20B by way of example, the write pointer WP of that buffer region is assigned to be the pointer for DMA (DMA access) and the read pointer RP is assigned to be the pointer for USB (USB access). For data transmission when CPU (PIO) transfer is used, the write pointer WP of that buffer region is assigned to be the pointer for CPU (CPU access) and the read pointer RP is assigned to be the pointer for USB.

For data reception (transfer of data from USB to the DMA or CPU through the packet buffer 100) when DMA transfer is used, as shown in FIG. 20C, the write pointer WP of that buffer region is assigned to be the USB pointer and the read pointer RP is assigned to be the DMA pointer. Similarly, for data reception when CPU transfer is used, the write pointer WP of that buffer region is assigned to be the USB pointer and the read pointer RP is assigned to be the CPU pointer.

Note that the pointer information (position information) for the write pointer WP and read pointer RP of each buffer region is stored in the transfer condition registers (PIPE/EP registers) of the register section 70.

A pointer management circuit 86 is a circuit for creating actual addresses for access to the packet buffer 100, while updating the pointers.

The pointer management circuit 86 includes a CPU address generation circuit 87, a DMA address generation circuit 88, and a USB address generation circuit 89. These address generation circuits 87, 88, and 89 generate CPU addresses, DMA addresses, and USB addresses, based on the CPU pointer, DMA pointer, and USB pointer assigned by the pointer assignment circuit 84. They also update the pointers at each access from the CPU (CPU interface circuit) or DMA (DMA handler circuit) and at each transaction end (handshake transmission/reception such as ACK or NAK). Note that post-update pointer information is overwritten into the transfer condition registers of the register section 70 through the region allocation circuit 82.

A buffer management circuit 90 is a circuit that manages accesses to the packet buffer 100.

The buffer management circuit 90 includes a buffer interface circuit 92. This buffer interface circuit 92 receives data such as CPU addresses, DMA addresses, and USB addresses from the pointer management circuit 86, performs input-output to the packet buffer 100, and outputs data such as addresses, output enable, write enable, and read enable.

The buffer management circuit 90 also includes an arbitration circuit 93. This arbitration circuit 93 is a circuit that arbitrates accesses from the CPU (CPU interface circuit) DMA (DMA handler circuit), and USB (host controller or peripheral controller). A CPU address, DMA address, of USB address is output as an access address for the packet buffer 100, based on this arbitration result, to set a data transfer path between the CPU, DMA, or USB and the packet buffer 100.

An HC/PC selector 94 performs switching control of the connection between the buffer management circuit 90 (the buffer controller 80) and either the host controller 50 (HC) or the peripheral controller 60 (PC). During host operation, it connects the host controller 50 and the buffer management circuit 90, and during peripheral operation, it connects the peripheral controller 60 and the buffer management circuit 90. Note that this connection switching control is based on an HC/PC enable signal from the OTG controller 20.

10. Electronic Equipment

The description now turns to examples of electronic equipment including the data transfer control device of this embodiment of the invention.

Figure 21A:
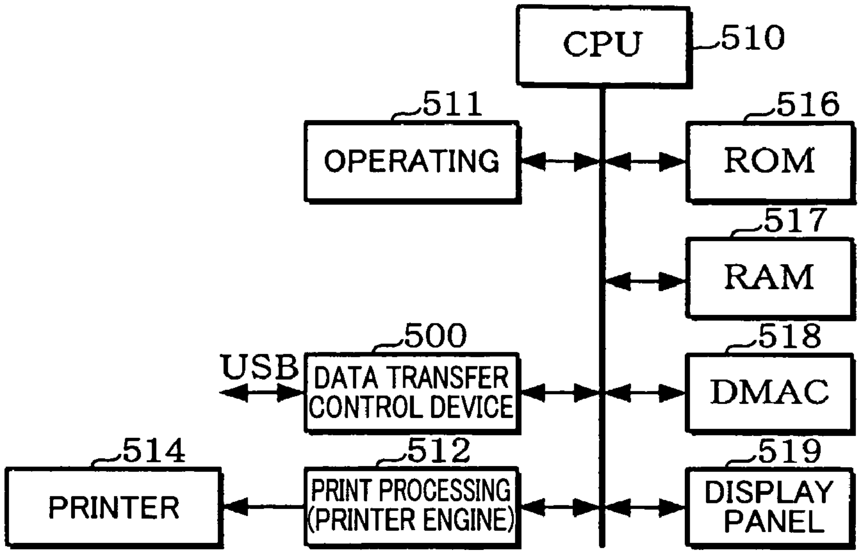
FIGS. 21A, 21B, and 21C are internal block diagrams of various items of electronic equipment.
Figure 22A:
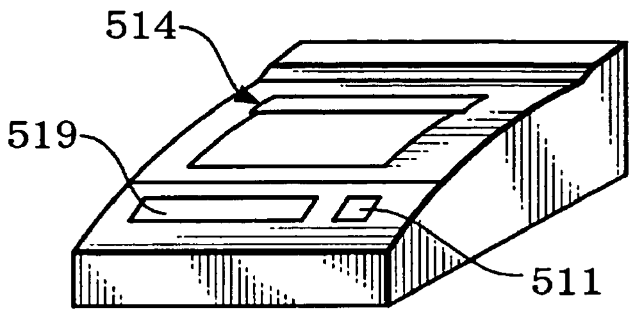
FIGS. 22A, 22B, and 22C are external views of various items of electronic equipment.

An internal block diagram of a printer that is one example of such electronic equipment is shown in FIG. 21A with an external view thereof being shown in FIG. 22A. A CPU 510 (processing section) has various functions, including that of controlling the entire system. An operating section 511 is designed to enable the user to operate the printer. Data such as a control program and fonts is stored in a ROM 516, and a RAM 517 (system memory) functions as a work area for the CPU 510. A DMAC 518 is a DMA controller for transferring data through the CPU 510. A display panel 519 is designed to inform the user of the operational state of the printer.

Serial print data that has been send in from another device such as a personal computer, digital camera, or digital video camera via USB is converted into parallel print data by a data transfer control device 500. The thus converted parallel print data is sent to a print processing section (a printer engine) 512 by the CPU 510 or the DMAC 518. This parallel print data is subjected to given processing in the print processing section 512 and is output for printing to paper by a printer section (a device for outputting data) 514 including components such as a print head.

Figure 21B:
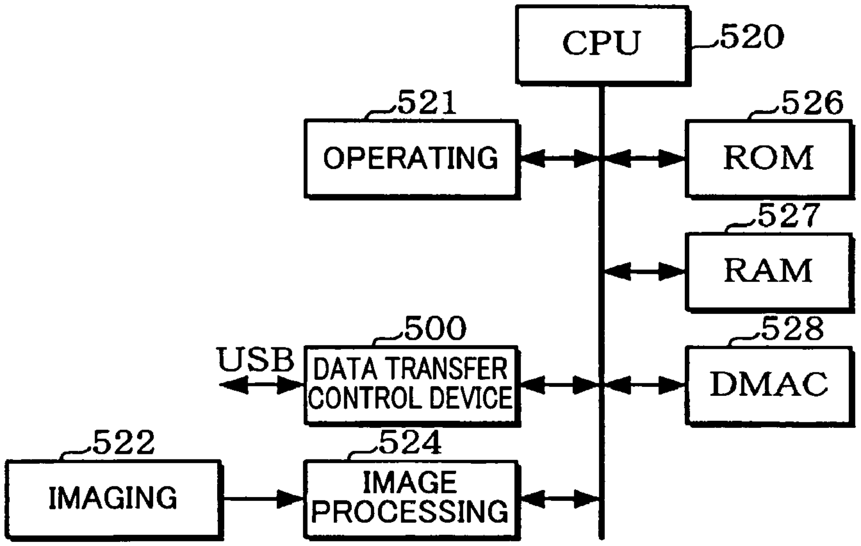
Figure 22B:
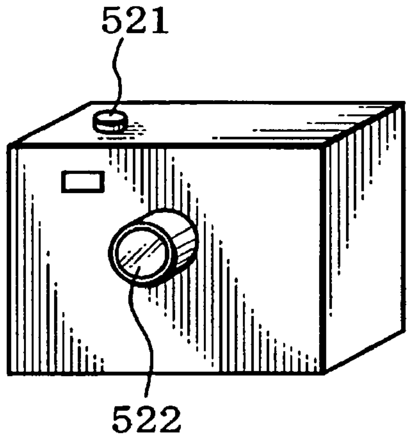

An internal block diagram of a digital camera that is another example of electronic equipment is shown in FIG. 21B with an external view thereof being shown in FIG. 22B. A CPU 520 has various functions, including that of controlling the entire system. An operating section 521 (including controls such as a shutter button and operating buttons) is designed to enable the user to operate the digital camera. Data such as a control program is stored in a ROM 526, and a RAM 527 functions as a work area for the CPU 520. A DMAC 528 is a DMA controller.

An image of a document is captured by an image capture section (a device for fetching data) 522, which includes components such as a CCD and lens, and data of the captured image is processed by an image processing section 524. The processed image data is sent to the data transfer control device 500 by the CPU 520 or DMAC 528. The data transfer control device 500 converts that parallel image data into serial data and sends it to another device such as a printer, storage device, or personal computer via USB.

Figure 21C:
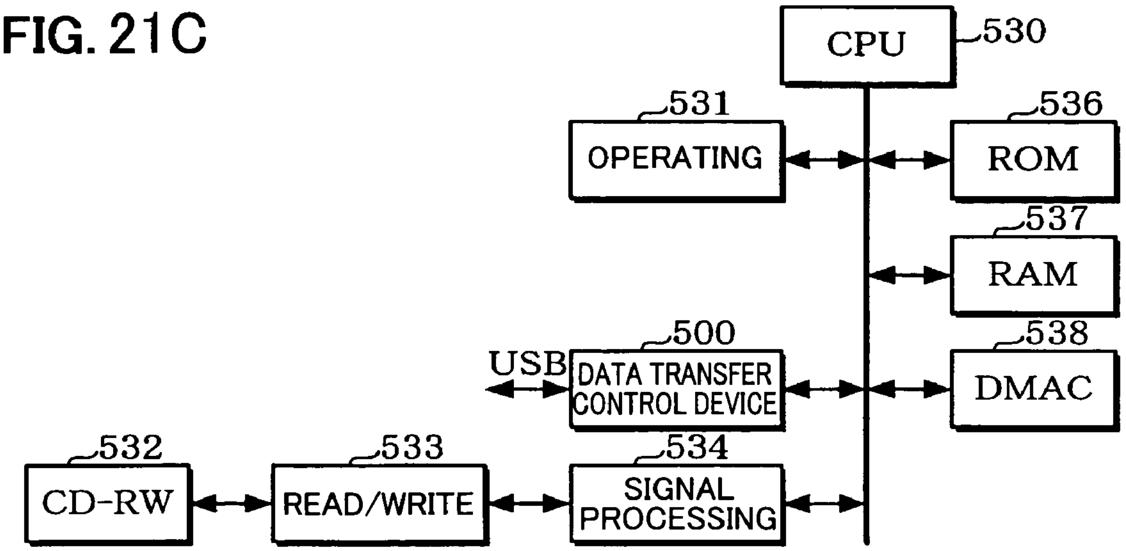
Figure 22C:
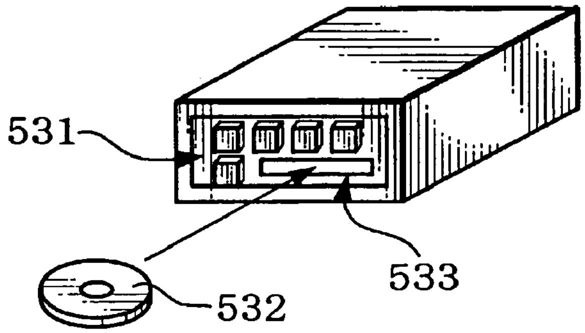

An internal block diagram of a CD-RW drive that is a further example of electronic equipment is shown in FIG. 21C with an external view thereof being shown in FIG. 22C. A CPU 530 has various functions, including that of controlling the entire system. An operating section 531 is designed to enable the user to operate the CD-RW drive. Data such as a control program is stored in a ROM 536, and a RAM 537 functions as a work area for the CPU 530. A DMAC 538 is a DMA controller.

Data read out from a CD-RW 532 by a read/write section (a device for fetching data or a device for storing data) 533, which includes components such as a laser, a motor, and an optical system, is input to a signal processing section 534 where it is subjected to given signal processing such as error correction. The data that has been subjected to this signal processing is sent to the data transfer control device 500 by the CPU 530 or the DMAC 538. The data transfer control device 500 converts this parallel data into serial data, then sends it to another device via USB.

Serial data that comes in from another device via USB, on the other hand, is converted into parallel data by the data transfer control device 500. This parallel data is sent to the signal processing section 534 by the CPU 530 or the DMAC 538. This parallel print data is subjected to given signal processing by the signal processing section 534 then is stored by the read/write section 533 on the CD-RW 532.

Note that a separate CPU for controlling data transfer by the data transfer control device 500 could be provided in addition to the CPU 510, 520, or 530 of FIGS. 21A, 21B, and 21C.

Use of the data transfer control device of this embodiment of the present invention in electronic equipment makes it possible to implement electronic equipment having the OTG function. In other words, electronic equipment can be made to have the role of host and also the role of a device, enabling the development of applications that have not existed up until now.

Use of the data transfer control device of this embodiment in electronic equipment makes it possible to reduce the processing load on the CPU (processing section) incorporated in electronic equipment, thus making it possible to use an inexpensive CPU. The CPU can also be made to have some spare time for processing other than data transfer control processing, enabling an increase in the capabilities of the electronic equipment and a reduction in the cost thereof. This also makes it possible to simplify firmware programs operating on the CPU, thus shortening the development period of electronic equipment.

Note that electronic equipment that can employ the data transfer control device in accordance with this embodiment includes other types of electronic equipment such as various types of optical disk drive (CD-ROM or DVD), magneto-optic disk drives (MO), hard disk drives, digital video cameras, mobile phones, scanners, TVs, VCRs, audio equipment, telephones, projectors, personal computers, electronic note books, and dedicated word processors.

Note also that the present invention is not limited to the embodiments described herein, and various modifications are possible within the scope of the invention laid out herein.

For example, the configuration of the data transfer control device in accordance with the present invention is preferably that as shown in FIG. 4, but it is not limited thereto.

The configuration of the circuit that implements the automatic control transfer is not limited to that shown in FIG. 13.

The configurations of the various blocks of the data transfer control device (such as the HC, PC, and OTGC blocks) are also not limited to those described with reference to this embodiment, and thus various modifications are possible.

The transfer condition information that is set in the transfer condition registers is similarly not limited to the information described with reference to this embodiment.

Terminology (such as: OTG controller, CPU/firmware, host controller or peripheral controller, USB, number of continuous executions of transactions, pipe region or end point region) that is derived from generic terminology defined within this document (such as: state controller, processing section, transfer controller, bus, transfer ratio information, buffer region, page size) could be replaced by other terminology used within this document.

It is possible for an aspect of the present invention that is defined by a dependent claim to omit some of the configurational requirements of the corresponding antecedent claim. Similarly, the components of the present invention defined by one independent claim can also be allocated to other independent claims.

This embodiment has been described with reference to the application thereof to the USB OTG standard, but the applications of the present invention are not limited to the OTG standard. In other words, the present invention can be applied to data transfer not only of the USB OTG standard, but also to the prior-art USB 1.1 and USB 2.0, as well as standards developed therefrom.

What is claimed is:

1. A data transfer control device for data transfer over a bus, the data transfer control device comprising:

transfer condition registers that store transfer condition information;

a transfer controller that performs the data transfer including a control transfer, based on the transfer condition information set in the transfer condition registers; and a buffer controller that performs access control of a packet buffer that stores transfer data to be transferred over the bus, the transfer controller automatically issuing a setup stage transaction and automatically transferring a setup stage packet when a start of an automatic control transfer is instructed and the data transfer control device operates as a host, then automatically issuing a data stage transaction and automatically transferring a data stage packet when there is data to be transferred in a data stage, and then automatically issuing a status stage transaction and automatically transferring a status stage packet, a data stage present/absent information and a transfer direction in the data stage being set as the transfer condition information in the transfer condition registers, the transfer controller comprising:

a selection circuit that selects one of an execution of a data stage IN transaction, an execution of a data stage OUT transaction, and a no data stage, the selection being based on the transfer direction in the data stage and the data stage present/absent information set in the transfer condition registers, and the selection occurring when the setup stage transaction has completed.

2. The data transfer control device defined by claim 1, device request data and total size of the transfer data of the data stage being set as the transfer condition information in the transfer condition registers.

3. The data transfer control device defined by claim 1, the data stage present/absent information, the transfer direction in the data stage, and a maximum packet size being set as the transfer condition information in each of the transfer condition registers.

4. The data transfer control device defined by claim 1, the transfer controller generating an interrupt with respect to a processing section when the status stage transaction has completed.

5. The data transfer control device defined by claim 1, the transfer controllerhalting the automatic control transfer and generating an interrupt with respect to a processing section, when a stall has been received from an end point.

6. The data transfer control device defined by claim 3, the transfer controller further comprising:

a circuit that instructs a start of the setup stage transaction when the start of the automatic control transfer is instructed;

a circuit that instructs the start of a data stage IN transaction when the execution of the data stage IN transaction has been selected, or instructs a start of the data stage OUT transaction when the execution of the data stage OUT transaction has been selected; and a circuit that instructs a start of a status stage OUT transaction when the started data stage IN transaction has completed, or instructs a start of a status stage IN transaction when the started data stage OUT transaction has completed or the no data stage has been selected.

7. The data transfer control device defined by claim 1, a plurality of pipe regions being allocated in the packet buffer, each of the pipe regions storing data transferred to and from corresponding one of the plurality of pipe regions, transfer condition information for the data transfer between each of the plurality of pipe regions and each of a plurality of end points being set in each of the transfer condition registers, and the transfer controller automatically issuing a control transfer transaction, based on the transfer condition information that has been set in one of the transfer condition registers corresponding to a pipe region for the control transfer among the plurality of pipe regions, and performing the automatic control transfer between the pipe regions for the control transfer and an end point for the control transfer among the plurality of end points.

8. The data transfer control device defined by claim 7, the plurality of pipe regions including a pipe region dedicated to the endpoint for the control transfer and a general-purpose pipe region capable of being assigned to arbitrary one of the plurality of end points, and the transfer controller using the dedicated pipe region to perform the automatic control transfer.

9. The data transfer control device defined by claim 1, further comprising:

a state controller that controls a plurality of states including a state of a host operation, in which the data transfer control device operates as a role of a host, and a state of a peripheral operation, in which the data transfer control device operates as a role of a peripheral, the transfer controller including:

a host controller that performs data transfer as a host during the host operation; and a peripheral controller that performs data transfer as a peripheral during the peripheral operation, and the host controller performs the automatic control transfer during the host operation.

10. The data transfer control device defined by claim 1, the data transfer conforming to the universal serial bus (USB) on-the-go (OTG) standard is performed.

11. The data transfer control device defined by claim 7, the data transfer conforming to the universal serial bus (USB) on-the-go (OTG) standard is performed.

12. The data transfer control device defined by claim 9, the data transfer conforming to the universal serial us (USB) on-the-go (OTG) standard is performed.

13. Electronic equipment comprising:

the data transfer control device defined by claim 1;

a device that performs output processing, fetch processing, or storage processing on data to be transferred through the data transfer control device and the bus; and a processing section that controls data transfer of the data transfer control device.

14. Electronic equipment comprising:

the data transfer control device defined by claim 7;

a device that performs output processing, fetch processing, or storage processing on data to be transferred through the data transfer control device and the bus; and a processing section that controls data transfer of the data transfer control device.

15. Electronic equipment comprising:

the data transfer control device defined by claim 9;

a device that performs output processing, fetch processing, or storage processing on data to be transferred through the data transfer control device and the bus; and a processing section that controls data transfer of the data transfer control device.

16. A data transfer control method for a data transfer control device operating as a host, the method comprising:

setting transfer condition information in transfer condition registers;

performing data transfer including a control transfer, based on transfer condition information set in the transfer condition registers;

performing access control of a packet buffer which stores transfer data; and automatically issuing a setup stage transaction and automatically transferring a setup stage packet when a start of an automatic control transfer is instructed, then automatically issuing a data stage transaction and automatically transferring a data stage packet when there is data to be transferred, and then automatically issuing a status stage transaction and automatically transfers a status stage packet, a data stage present/absent information and a transfer direction in a data stage being set as the transfer condition information in the transfer condition registers, the transfer control method comprising:

selecting one of an execution of a data stage IN transaction, an execution of a data stage OUT transaction, and a no data stage, the selection being based on the transfer direction in the data stage and the data stage present/absent information set in the transfer condition registers, and the selection occurring when the setup stage transaction has completed.

17. The data transfer control method defined by claim 16, further comprising:

setting device request data and a total size of the transfer data in the data stage as the transfer condition information in the transfer condition registers.

18. The data transfer control method defined by claim 16, further comprising:

instructing a start of the setup stage transaction when the start of the automatic control transfer is instructed;

selecting one of an execution of a data stage IN transaction, an execution of a data stage OUT transaction, and a no data stage, based on a transfer direction in the data stage and data stage present/absent information, when the started setup stage transaction has completed;

instructing a start of the data stage TN transaction when the execution of the data stage TN transaction has been selected, or instructing a start of the data stage OUT transaction when the execution of the data stage OUT transaction has been selected; and instructing a start of a status stage OUT transaction when the started data stage IN transaction has completed, or instructing a start of a status stage IN transaction when the started data stage OUT transaction has completed or no data stage has been selected.

19. The data transfer control method defined by claim 16, further comprising:

allocating a plurality of pipe regions in the packet buffer, each of the plurality of pipe regions storing data transferred to and from corresponding one of the plurality of pipe regions;

setting the transfer condition information for the data transfer between each of the plurality of pipe regions and each of a plurality of end points in each of the transfer condition registers; and automatically issuing a control transfer transaction, based on the transfer condition information that has been set in one of the transfer condition registers corresponding to a pipe region for the control transfer among the plurality of pipe regions, and performing the automatic control transfer between the pipe region for the control transfer and an endpoint for the control transfer among the plurality of end points.

20. The data transfer control method defined by claim 16, further comprising:

controlling a plurality of states including a state of a host operation, in which a data transfer control device operates as a role of a host, and a state of a peripheral operation, in which the data transfer control device operates as a role of a peripheral;

performing data transfer as a host during the host operation;

performing data transfer as a peripheral during the peripheral operation; and performing the automatic control transfer during the host operation.

21. A data transfer control device for data transfer over a bus, the data transfer control device comprising:

transfer condition registers that store transfer condition information; and a transfer controller that performs the data transfer based on transfer condition information set in the transfer condition registers, the transfer controller performing a control transfer that is one of transfer methods of the data transfer, the control transfer being carried out by executing a plurality of stages including a setup stage, a data stage, and a status stage, the transfer controller automatically executing the setup stage, the data stage, and the status stage, in sequence when the data transfer control device operates as a host and the transfer condition information is set to commence the control transfer, and a data stage present/absent information and a transfer direction in the data stage being set as the transfer condition information in the transfer condition registers, the transfer controller comprising:

a selection circuit that selects one of an execution of a data stage IN transaction, an execution of a data stage OUT transaction, and a no data stage, the selection being based on the transfer direction in the data stage and the data stage present/absent information set in the transfer condition registers, and the selection occurring when the setup stage has completed.

* * * * *